(12) United States Patent
Suzuki et al.

(10) Patent No.: US 9,838,569 B2
(45) Date of Patent: Dec. 5, 2017

(54) INFORMATION PROCESSING DEVICE, METHOD, SYSTEM, DISPLAY DEVICE, AND NON-TRANSITORY COMPUTER READABLE MEDIUM FOR DISPLAYING OPERATING IMAGES IN AN EFFICIENT MANNER

(71) Applicant: FUJI XEROX CO., LTD., Yokohama-shi, Kanagawa (JP)

(72) Inventors: Tetsuo Suzuki, Yokohama (JP); Yukio Tajima, Tokohama (JP); Masahiro Tose, Yokohama (JP); Kazuko Kirihara, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 26 days.

(21) Appl. No.: 14/802,552

(22) Filed: Jul. 17, 2015

(65) Prior Publication Data

US 2016/0088196 A1    Mar. 24, 2016

(30) Foreign Application Priority Data

Sep. 24, 2014 (JP) ................................ 2014-193647

(51) Int. Cl.
*H04N 1/00* (2006.01)
*H04N 1/60* (2006.01)

(52) U.S. Cl.
CPC ......... *H04N 1/6097* (2013.01); *H04N 1/0044* (2013.01); *H04N 1/00352* (2013.01); *H04N 1/00389* (2013.01); *H04N 1/00411* (2013.01); *H04N 1/00416* (2013.01); *H04N 1/00461* (2013.01); *H04N 1/00464* (2013.01); *H04N 1/00466* (2013.01); *H04N 1/00469* (2013.01); *H04N 1/00482* (2013.01)

(58) Field of Classification Search
None
See application file for complete search history.

(56) References Cited

U.S. PATENT DOCUMENTS

| 5,802,292 | A  | * | 9/1998 | Mogul | ............. | G06F 17/30902 |
| | | | | | | 707/E17.12 |
| 5,978,841 | A  | * | 11/1999 | Berger | ............. | G06F 17/30902 |
| | | | | | | 707/E17.12 |
| 6,182,133 | B1 | * | 1/2001 | Horvitz | ............. | G06F 17/30902 |
| | | | | | | 707/999.008 |
| 6,721,780 | B1 | * | 4/2004 | Kasriel | ............. | G06F 17/30902 |
| | | | | | | 707/E17.12 |

(Continued)

FOREIGN PATENT DOCUMENTS

JP    2012-014640 A    1/2012

*Primary Examiner* — Paul F Payer
(74) *Attorney, Agent, or Firm* — Oliff PLC

(57) ABSTRACT

An information processing device includes a processing part, a controlling part, and a providing part. The processing part executes a process. The controlling part controls the processing part to execute the process when the process corresponding to an operation on an operating image is requested from a display device that temporarily stores and displays an externally provided operating image. The providing part provides a first operating image to be displayed by the display device to the display device in advance, and provides, to the display device, a second operating image displayed when the first operating image is operated, within a range not exceeding a quantity predetermined as an upper limit.

15 Claims, 19 Drawing Sheets

(56) References Cited

U.S. PATENT DOCUMENTS

| | | | | |
|---|---|---|---|---|
| 7,047,485 B1* | 5/2006 | Klein | ............ | G06F 17/30902 |
| | | | | 707/E17.12 |
| 7,239,409 B2* | 7/2007 | Parry | ............ | G06F 3/1267 |
| | | | | 358/1.13 |
| 7,581,028 B2* | 8/2009 | Han | ............ | H04L 69/04 |
| | | | | 709/219 |
| 7,589,849 B2* | 9/2009 | Carney | ............ | G06F 3/1204 |
| | | | | 358/1.14 |
| 7,930,206 B2* | 4/2011 | Koningstein | ............ | G06Q 10/10 |
| | | | | 705/14.4 |
| 8,224,801 B1* | 7/2012 | Wolfe | ............ | G06F 17/30306 |
| | | | | 707/706 |
| 8,473,688 B2* | 6/2013 | Allen | ............ | G06F 12/0862 |
| | | | | 710/40 |
| 8,898,244 B2* | 11/2014 | Miglore | ............ | G06F 17/30 |
| | | | | 709/209 |
| 9,019,543 B2* | 4/2015 | Ishii | ............ | H04N 1/32539 |
| | | | | 358/1.13 |
| 9,043,385 B1* | 5/2015 | Lepeska | ............ | G06F 17/30902 |
| | | | | 709/203 |
| 9,348,936 B2* | 5/2016 | B'Far | ............ | G06F 17/30902 |
| 2012/0005630 A1 | 1/2012 | Ohba et al. | | |
| 2012/0105907 A1* | 5/2012 | Song | ............ | G06F 3/1203 |
| | | | | 358/1.15 |
| 2015/0212655 A1* | 7/2015 | Koski | ............ | G06F 17/30902 |
| | | | | 715/730 |

* cited by examiner

READY TO COPY.

| COPY | ADJUST QUALITY | READING METHOD | OUTPUT FORMAT | EDIT JOB |

QUALITY OF ORIGINAL
TEXT/PHOTO
A21

COPY INTENSITY
NORMAL
A22

SHARPNESS
NORMAL
A23

SATURATION
NORMAL
A24

CONTRAST
NORMAL
A25

QUALITY
STANDARD QUALITY
A26

READY TO COPY.

COPY INTENSITY

A31  A32  A33

CANCEL — A34
CLOSE — A35

LIGHT                              INTENSE

FIG. 18

| SIZE OF STORAGE AREA | LIMIT |
|---|---|
| LESS THAN 100 MB | 10 |
| AT LEAST 100 MB, LESS THAN 300 MB | 20 |
| AT LEAST 300 MB | 30 |

FIG. 19

| SIZE OF STORAGE AREA | LIMIT |
|---|---|
| LESS THAN 100 MB | 20 MB |
| AT LEAST 100 MB, LESS THAN 300 MB | 40 MB |
| AT LEAST 300 MB | 80 MB |

FIG. 22

| PROCESSING PERFORMANCE | LIMIT |
|---|---|
| 1 CORE | 10 |
| 2 CORES | 20 |
| 3 CORES OR MORE | 30 |

FIG. 23

| IDENTIFICATION INFORMATION | OPERATION HISTORY |
|---|---|
| A12 | 4 TIMES |
| A13 | 8 TIMES |
| A14 | 12 TIMES |
| A15 | 2 TIMES |

FIG. 24

| OPERATION HISTORY TOTAL | LIMIT |
|---|---|
| LESS THAN 20 TIMES | 10 |
| AT LEAST 20 TIMES, LESS THAN 50 TIMES | 20 |
| AT LEAST 50 TIMES | 30 |

| IDENTIFICATION INFORMATION OF FIRST OPERATING IMAGE | OPERATION HISTORY OF SECOND OPERATING IMAGE |
|---|---|
| A12 | 12 TIMES |
| A13 | 8 TIMES |
| A14 | 28 TIMES |
| A15 | 2 TIMES |

INFORMATION PROCESSING DEVICE, METHOD, SYSTEM, DISPLAY DEVICE, AND NON-TRANSITORY COMPUTER READABLE MEDIUM FOR DISPLAYING OPERATING IMAGES IN AN EFFICIENT MANNER

CROSS-REFERENCE TO RELATED APPLICATIONS

This application is based on and claims priority under 35 USC 119 from Japanese Patent Application No. 2014-193647 filed Sep. 24, 2014.

BACKGROUND

Technical Field

The present invention relates to an information processing device and method, an information processing system, a display device, and a non-transitory computer readable medium.

SUMMARY

According to an aspect of the invention, there is provided an information processing device including a processing part, a controlling part, and a providing part. The processing part executes a process. The controlling part controls the processing part to execute the process when the process corresponding to an operation on an operating image is requested from a display device that temporarily stores and displays an externally provided operating image. The providing part provides a first operating image to be displayed by the display device to the display device, and provides, to the display device in advance, a second operating image displayed when the first operating image is operated, within a range not exceeding a quantity predetermined as an upper limit.

BRIEF DESCRIPTION OF THE DRAWINGS

Exemplary embodiments of the present invention will be described in detail based on the following figures, wherein:

FIGS. 8A and 8B are diagrams illustrating an example of other displayed operating images;

FIG. 18 is a diagram illustrating an example of an upper limit table;

FIG. 19 is a diagram illustrating another example of an upper limit table;

FIG. 22 is a diagram illustrating an example of an upper limit table according to an exemplary modification;

FIG. 23 is a diagram illustrating a stored operation history;

FIG. 24 is a diagram illustrating another example of an upper limit table according to an exemplary modification;

DETAILED DESCRIPTION

[1] Exemplary Embodiment

First, an overall configuration, a hardware configuration, and a functional configuration of an information processing system according to the exemplary embodiment will be described with reference to FIGS. 1 to 11.

[1-1] Overall Configuration

Figure 1:
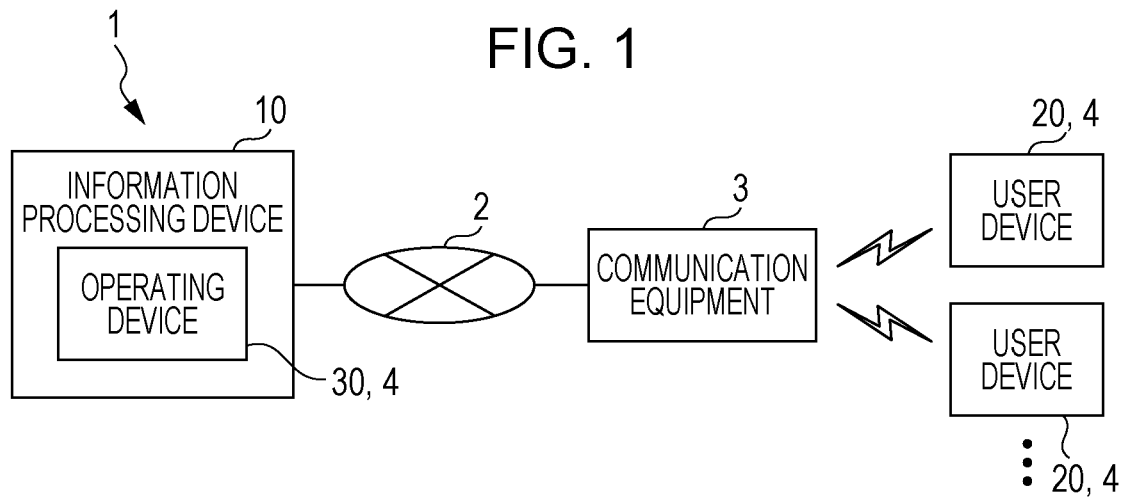
FIG. 1 is a block diagram illustrating an example of an overall configuration of an information processing system according to an exemplary embodiment.

FIG. 1 is a block diagram illustrating an example of an overall configuration of an information processing system. FIG. 1 illustrates an information processing system 1 provided with a communication link 2, communication equipment 3, an information processing device 10, and multiple user devices 20. In the present exemplary embodiment, the information processing system 1 is a system that provides users with functions such as copy, scan, facsimile (fax), and print (the output of image data to a medium) functions.

The communication link 2 is a system for communication, including at least one of the Internet, a mobile communication network, and a telephone network, for example. The communication link 2 mediates communication between devices connected to the system. The information processing device 10 and the communication equipment 3 are connected to the communication link 2. The communication equipment 3 is a communication device that includes a function of mediating communication, such as a router, hub, or access point. In the present exemplary embodiment, the communication equipment 3 is an access point, and conducts wireless communication conforming to a wireless LAN standard.

The communication equipment 3 communicates wirelessly with the user devices 20 on the one hand, while also communicating the information processing device 10 via the communication link 2. In other words, the information processing device 10 communicates the user devices 20 via the communication system designated the communication link 2, and an external communication device designated the communication equipment 3. Note that the communication equipment 3 is an example of a communication device to which the user devices 20 connect, and the user devices 20 may also communicate with the information processing device 10 via another communication device. However, the "other communication device" referred to herein does not encompass the information processing device 10 and the operating device 30. Hereinafter, the term "other communication device" will be used to denote a communication device that is neither the information processing device 10, the user devices 20, nor the operating device 30.

The information processing device 10 is a device that conducts processes such as an image forming process of forming an image onto a medium, and an image reading process of reading an image formed on a medium. These processes are conducted when a function such as copy, scan, fax, or print discussed earlier is provided to a user. The information processing device 10 includes an operating device 30 used to operate the information processing device 10 itself. The operating device 30 is a device for operating the information processing device 10. The operating device 30 is secured to the housing of the information processing device 10, and is used by a user who comes to the place where the information processing device 10 is installed. The operating device 30 includes a liquid crystal display or the like, for example, and displays an image for operating the information processing device 10 (hereinafter called an "operating image"). An operating image will be described with reference to FIG. 6.

Figure 6:
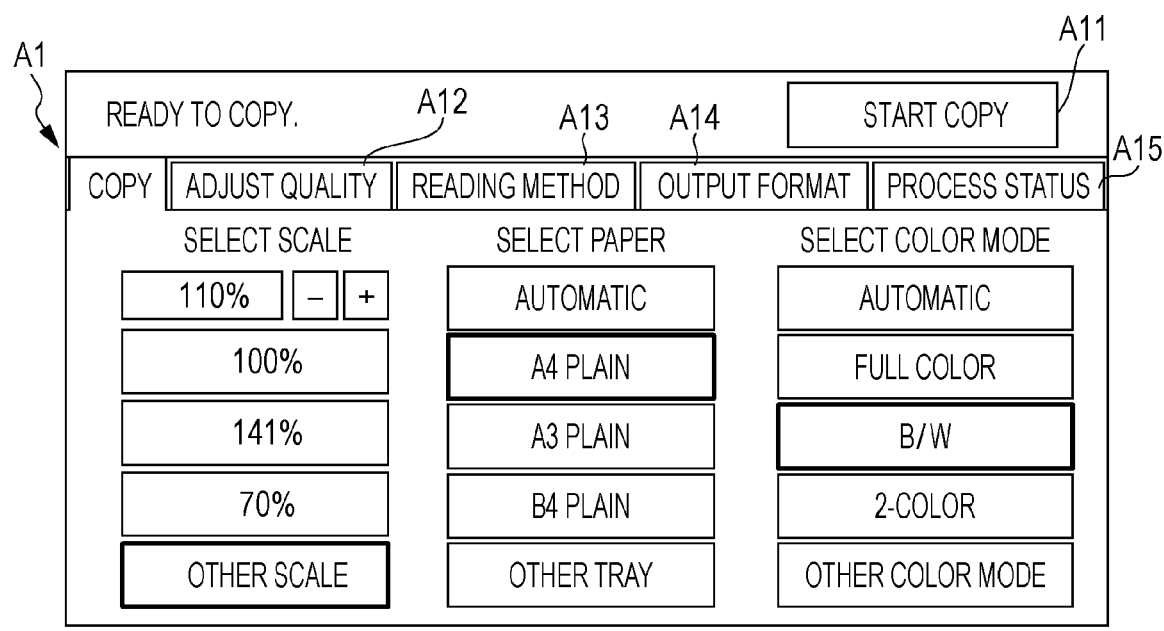
FIG. 6 is a diagram illustrating an example of displayed operating images.

FIG. 6 is a diagram illustrating an example of displayed operating images. In the example of FIG. 6, an operating image group A1 for using the copy function is displayed. The operating image group A1 includes an operating image A11 for starting a copy operation, for example. The user performs the operation corresponding to the operating image A11, that is, an operation of starting a copy operation, by tapping (lightly pressing) the operating image A11.

When an operation is performed on a displayed operating image, the operating device 30 transmits a request corresponding to the operation to the information processing device 10. When the operating image A11 is operated, the operating device 30 transmits to the operating device 30 a request for a process for providing a copy function (specifically, a series of processes including an image reading process and an image forming process, hereinafter called the "copy process") as the process corresponding to the operating image A11.

The operating device 30 does not store an operating image in advance, and instead temporarily stores and displays an operating image provided externally. Specifically, the information processing device 10 stores an operating image, and provides an operating image in response to a request from the operating device 30. After the operating image finishes being displayed, such as when another image is displayed or when the power is turned off, for example, the operating device 30 deletes the temporarily stored operating image from storage. In this way, the operating device 30 is configured not to continually store an operating image.

Like the operating device 30, the user device 20 also temporarily stores and displays an operating image provided from the information processing device 10, and if an operation is performed on the displayed operating image, transmits a request for a process corresponding to the operation to the information processing device 10. The user device 20 is a tablet or a personal computer, for example, and may be used while being carried by a user, or by being installed at a desk. In addition, the user device 20 is not limited to operation of the information processing device 10, and may also be used for other applications (such as office work).

The information processing device 10 executes a process on the basis of a request from the operating device 30 or the user device 20, and transmits information expressing the status of the executed process (hereinafter called "status information" to the above devices, thereby notifying the above devices about the status of the process.

Figure 7A:
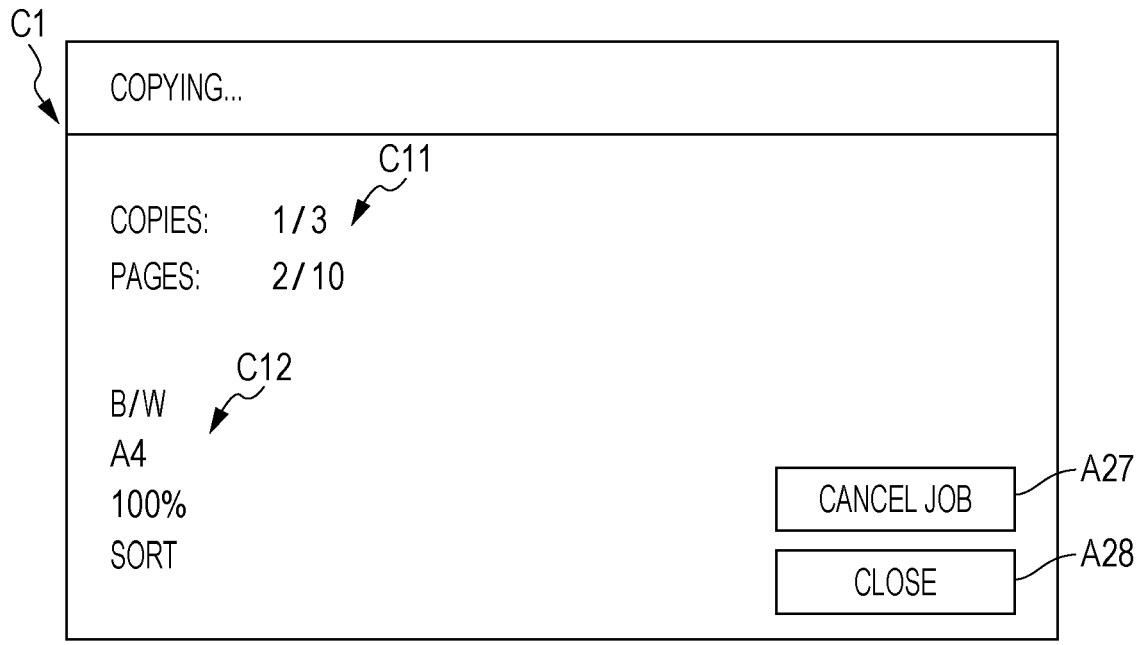
FIGS. 7A and 7B are diagrams illustrating an example of displayed status information.
Figure 7B:
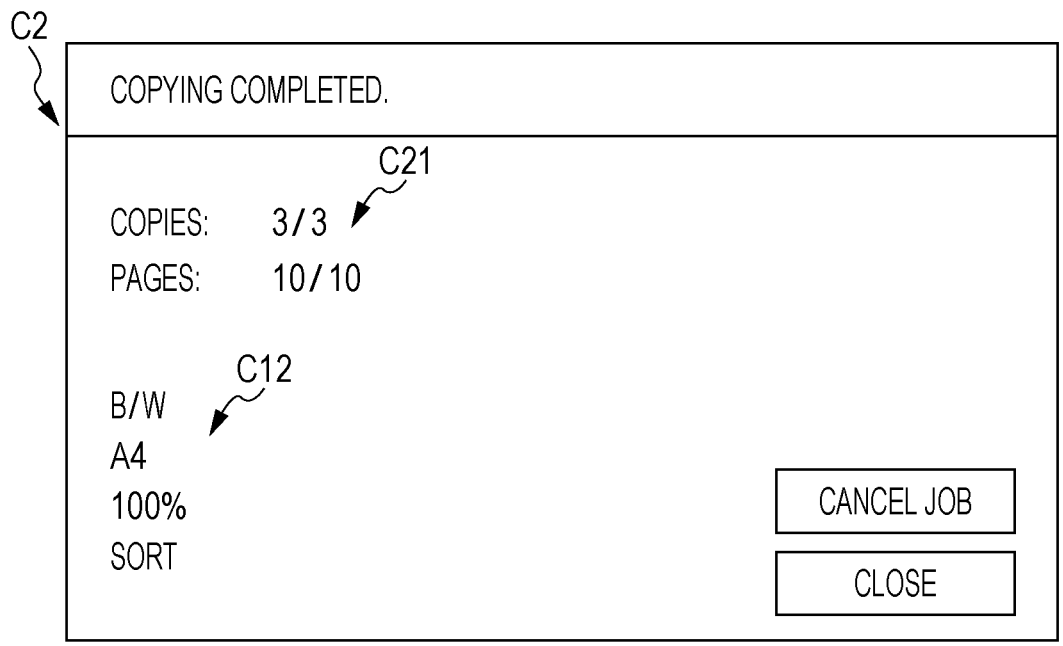

FIGS. 7A and 7B is a diagram illustrating an example of status information. For example, in the case of executing the copy process, the information processing device 10 transmits status information C1 including information such as quantity information C11 expressing the number of copies that have finished copying (the number of documents and the number of pages), a character string stating "Copying . . . ", and the copy parameters "B/W", "A4", "100%", and "Sort", as illustrated in FIG. 7A.

Also, after the copy process proceeds and the copying of the requested number of copies is completed, the information processing device 10 transmits status information C2 including information such as quantity information C21 expressing that the requested number of copies has completed copying, and a character string stating "Copying completed.", as illustrated in FIG. 7B. Note that the quantity information C11 and C21 is expressed as a fraction, in which the denominator is the requested number of copies, and the numerator is the number of completed copies. In this way, the status information includes information expressing the progress of the process, information expressing the result of the process, information about parameters used by the process, and the like. The operating device 30 and the user device 20 are both display devices that display the provided operating image as illustrated in FIG. 6, and display the reported status as illustrated in FIGS. 7A and 7B. Hereinafter, the operating device 30 and the user device 20 will be designated the display device 4 when not being distinguished.

[1-2] Hardware Configuration

Figure 2:
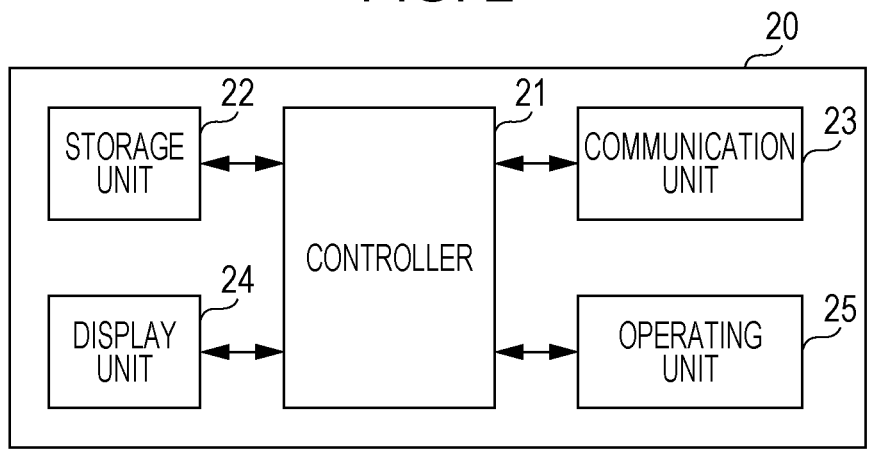
FIG. 2 is a block diagram illustrating an example of a hardware configuration of a user device.

FIG. 2 is a block diagram illustrating an example of a hardware configuration of the user device 20. The user device 20 is a computer equipped with a controller 21, a storage unit 22, a communication unit 23, a display unit 24, and an operating unit 25. The controller 21 is equipped with a central processing unit (CPU), read-only memory (ROM), random access memory (RAM), and a real-time clock, and controls the action of each component by having the CPU execute a program stored in the ROM or the storage unit 22 while using the RAM as a work area. The real-time clock calculates and reports the current date and time to the CPU.

The storage unit 22 is equipped with a hard disk drive (HDD), solid-state drive (SSD), or the like, and stores information such as data and programs used for control by the controller 21, and image data. The communication unit 23 is a communication module equipped with a communication circuit and antenna that conduct wireless communication conforming to a wireless local area network (LAN) standard, and conducts wireless communication with the communication equipment 3 illustrated in FIG. 1, for example. In other words, the communication unit 23 is a module that communicates with the other communication device discussed earlier (that is, a communication device that is neither the information processing device 10, the user device 20, nor the operating device 30; the communication equipment 3 is an example).

The display unit 24 includes a liquid crystal display or the like, and is controlled by the controller 21 to display an image on a display screen. The display unit 24 displays the operating image discussed earlier, for example. When an operating image is provided from the information processing device 10, the controller 21 causes the provided operating image to be stored temporarily in a local storage area, and causes the display unit 24 to display the stored operating image. The storage area referred to herein may be a storage area in what is called the primary storage (for example, RAM), but may also be a storage area in cache memory or an auxiliary storage device (for example, a HDD or SSD).

When the local device is a tablet, for example, the operating unit 25 is equipped with a touch sensor layered with a display screen (also called a touch screen or touch panel), buttons provided on the housing, and the like, receives a user operation such as a tap discussed earlier, and supplies operation data indicating details of the operation to the controller 21. Note that when the local device is a personal computer, the operating unit 25 may also be equipped with a keyboard and a mouse. The controller 21 controls device behavior according to supplied operation data.

Figure 3:
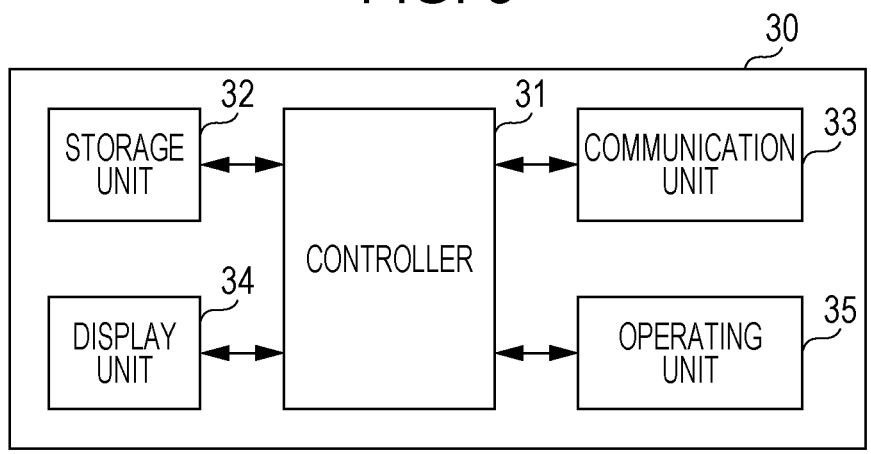
FIG. 3 is a block diagram illustrating an example of a hardware configuration of an operating device.

FIG. 3 is a block diagram illustrating an example of a hardware configuration of the operating device 30. The operating device 30 is a computer equipped with a controller 31, a storage unit 32, a communication unit 33, a display unit 34, and an operating unit 35. Hereinafter, the blocks expressing the same hardware as the blocks illustrated in FIG. 2 (the components other than the communication unit 33) will be denoted with the same names, and description thereof will be reduced or omitted. The communication unit 33 is equipped with a communication circuit that conducts communication conforming to a wired LAN standard, and a port that accepts the insertion of a connector provided on a communication cable (specifically, a LAN cable). The communication unit 33 is a module that communicates with the information processing device 10 without going through the other communication device discussed earlier.

Figure 4:
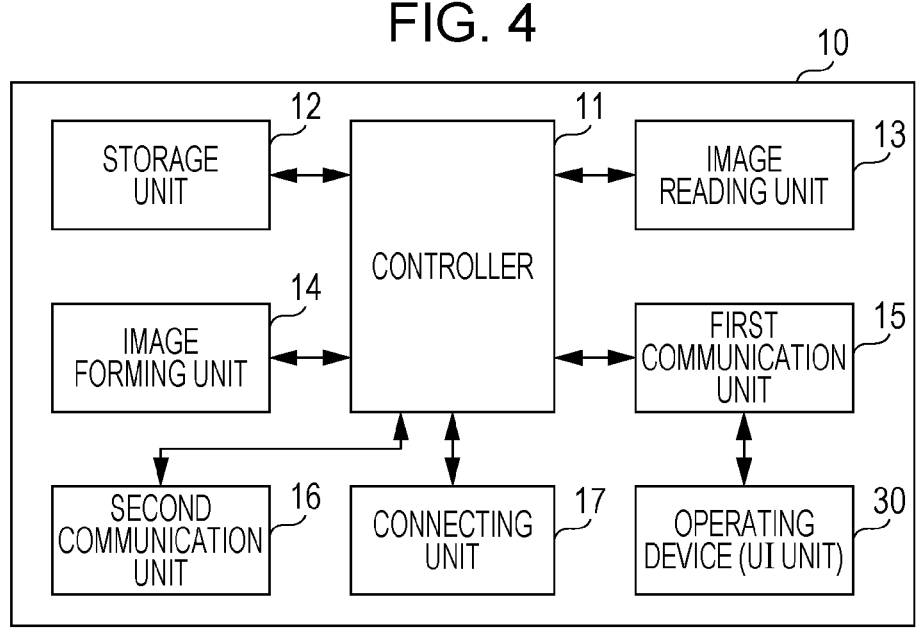
FIG. 4 is a block diagram illustrating an example of a hardware configuration of an information processing device.

FIG. 4 is a block diagram illustrating an example of a hardware configuration of the information processing device 10. The information processing device 10 is a computer equipped with a controller 11, a storage unit 12, an image reading unit 13, an image forming unit 14, a first communication unit 15, a second communication unit 16, and a connecting unit 17. Hereinafter, the blocks expressing the same hardware as the blocks illustrated in FIGS. 2 and 3 (the controller 11 and the storage unit 12) will be denoted with the same names, and description thereof will be reduced or omitted. Additionally, the information processing device 10 is equipped with the operating device 30 discussed earlier that functions as a user interface (UI) unit. In the present exemplary embodiment, the controller 11 controls components other than the operating device 30.

The image reading unit 13 conducts an image reading process of reading an image drawn on a document by using a charge-coupled device (CCD), for example. The image reading unit 13 optically reads an image of content formed on a medium such as a sheet of paper, and supplies image data expressing the read image to the controller 11. The image forming unit 14 conducts an image forming process of forming an image onto a medium by using an electrophotographic system, for example. The image forming unit 14 forms an image indicated by image data supplied from the controller 11 onto a medium such as a sheet of paper. Note that the above methods used to read an image and form an image are respective examples, and other methods are also acceptable.

The first communication unit 15 is equipped with a communication circuit that conducts communication conforming to a wired LAN standard, and a port that accepts the insertion of a connector provided on a communication cable (specifically, a LAN cable), and conducts a communication process of communicating with a device connected via the cable. The first communication unit 15 is connected to the communication link 2 illustrated in FIG. 1, and communicates with a user device 20, for example, via an external device (that is, external to the information processing device 10, such as the communication equipment 3, for example). In addition, the first communication unit 15 is connected to the communication unit 33 of the operating device 30 via a communication cable, and communicates with the operating device 30 without going through the above external device. In other words, the communication unit 33 also communicates with the information processing device 10 without going through the above external device.

The second communication unit 16 is equipped with a communication circuit for conducting fax communication, and conducts a process of exchanging fax data, or in other words a fax communication process. The connecting unit 17 includes a slot or the like that connects a storage medium such as an SD memory card, thereby connecting such storage media. The controller 11 reads out data stored in such storage media or writes data to such storage media, via the connecting unit 17. The operating device 30 is equipped with the configuration discussed in the description of FIG. 3, and communicates with the first communication unit 15. By communicating, the operating device 30 functions as a user interface unit (UI unit) that displays an image indicating data transmitted from the controller 11, or transmits data for operating the information processing device 10 to the controller 11, for example.

[1-3] Functional Configuration

The functions discussed hereinafter are realized as a result of the respective controllers of the information processing device 10, the user device 20, and the operating device 30 controlling respective components by executing programs stored in the respective storage units.

Figure 5:
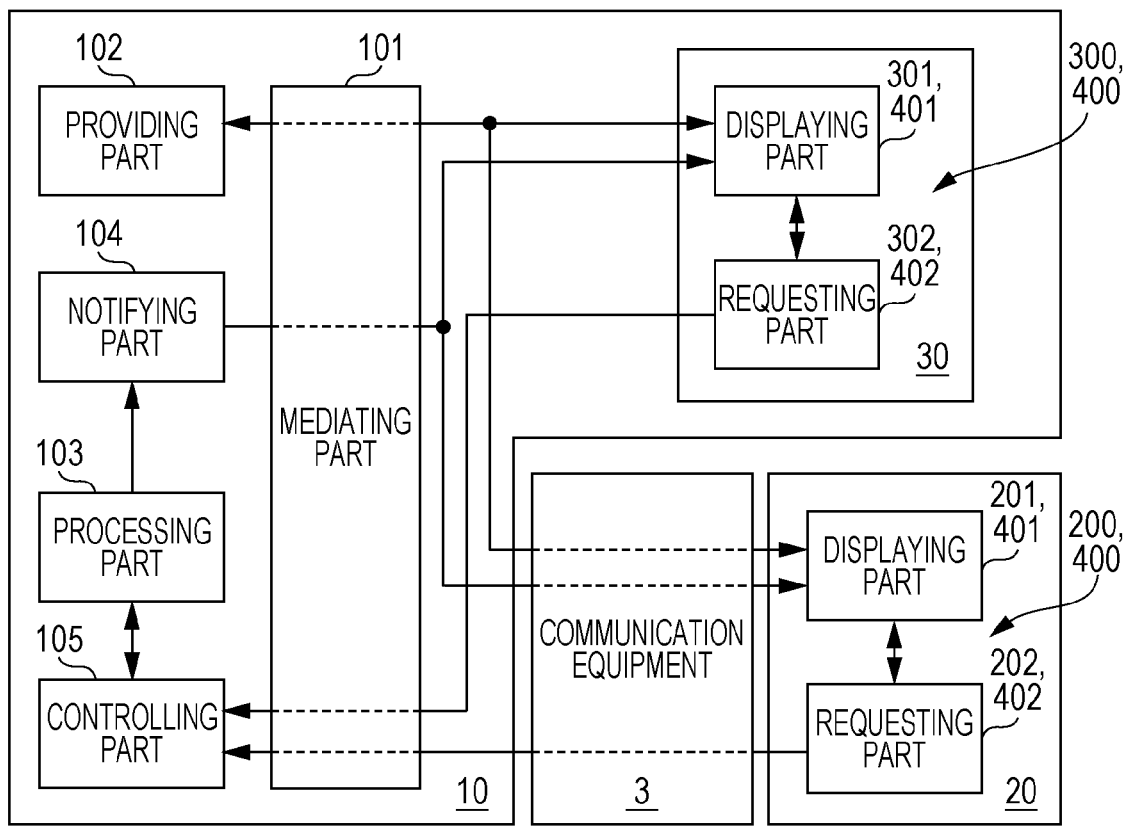
FIG. 5 is a block diagram illustrating an example of a functional configuration of an information processing system.

FIG. 5 is a block diagram illustrating an example of a functional configuration of an information processing system 1. The information processing device 10 is equipped with a mediating part 101, a providing part 102, a processing part 103, a notifying part 104, and a controlling part 105. The user device 20 is equipped with an operating part 200, while the operating device 30 is equipped with an operating part 300.

[1-3-1] Mediating Part

The mediating part 101 of the information processing device 10 mediates communication between the local device (information processing device 10) and the display device 4. More specifically, the mediating part 101 mediates communication with a display device 4 (in the present exemplary embodiment, a user device 20) connected to the local device via the other communication device discussed earlier (for example, the communication equipment 3). Additionally, the mediating part 101 mediates communication with a display device 4 (in the present exemplary embodiment, the operating device 30) connected to the local device without going through the other communication device. A sequence of communication used by the mediating part 101 (also referred to as a communication protocol) will be described hereinafter.

The mediating part 101 mediates communication conforming to a World Wide Web (WWW; hereinafter also called "web") standard with the display device 4 (the user device 20 and the operating device 30). The mediating part 101 mediates the communication of data which conforms to the Simple Object Access Protocol (SOAP) from among web standards, and which is stated in Extensible Markup Language (XML; hereinafter called "XML data"), for example. The mediating part 101 receives, and supplies to the providing part 102 discussed later, XML data indicating a Hypertext Transfer Protocol (HTTP) request transmitted from the display device 4, or receives and transmits to the display device 4 XML data indicating an HTTP response supplied from the providing part 102 discussed later in response.

In addition, the mediating part 101 also conforms to the WebSocket standard. Once the display device 4 is connected with a Transmission Control Protocol (TCP) handshake procedure on the basis of this standard, the mediating part 101 not only mediates the communication of XML data indicating an HTTP request and an HTTP response, but also the transmission of XML data from the providing part 102 to the display device 4 which is conducted at arbitrary timings, for example. Consequently, the information processing system 1 is configured to conduct not only pull communication according to HTTP requests originating from the display device 4, but also push communication originating from the information processing device 10.

The mediating part 101 mediates communication between the providing part 102, the notifying part 104, the controlling part 105, displaying parts 201 and 301 (hereinafter called the "displaying part 401" when not being distinguished respectively), and requesting parts 202 and 302 (hereinafter called the "requesting part 402" when not being distinguished respectively) to be discussed hereinafter. Specifically, the mediating part 101 respectively mediates communication conducted by the providing part 102 and the notifying part 104 of the information processing device 10 with the displaying part 401 of the display device 4, and respectively mediates communication conducted by the requesting part 402 of the display device 4 with the controlling part 105 of the information processing device 10. In both cases, the mediating part 101 mediates communication with the user device 20 and the operating device 30 with a common communication procedure (a communication procedure conforming to standards such as WWW, SOAP, and WebSocket).

[1-3-2] Providing Part

The providing part 102 of the information processing device 10 provides the operating image discussed earlier to the display device 4 via the mediating part 101. The providing part 102 provides the operating image to the user device 20 by communication via the mediating part 101 and the other communication device discussed earlier. Additionally, the providing part 102 provides the operating image to the operating device 30 by communication that goes through the mediating part 101, but does not go through the other communication device.

The providing part 102 stores an operating image (specifically, image data illustrating an operating image), and when XML data indicating an HTTP request for an operating image (hereinafter called "operating image request data") is transmitted via the mediating part 101, transmits XML data indicating an HTTP response including the operating image requested by that XML data (hereinafter called "operating image data") to the request source via the mediating part 101.

When operating image request data is transmitted from the user device 20, the providing part 102 transmits operating image data to the user device 20 in response. In addition, when operating image request data is transmitted from the operating device 30, the providing part 102 transmits operating image data to the operating device 30 in response. By transmitting operating image data to the source of a request for an operating image (the user device 20 and the operating device 30) in this way, the providing part 102 respectively provides operating images to these request sources.

[1-3-3] Processing Part

The processing part 103 of the information processing device 10 executes processes. The processing part 103 executes the copy process discussed earlier, as well as processes such as a scan process, a fax process, a print process (processes for providing the scan function, fax function, and print function, respectively). The copy process includes an image reading process by the image reading unit 13 and an image forming process by the image forming unit 14 illustrated in FIG. 4. The scan process includes an image reading process, while the fax process includes a fax communication process by the second communication unit 16. Meanwhile, the print process includes a communication process by the first communication unit 15 and an image forming process. The scan process and the fax process additionally include processes such as a data communication process using the second communication unit 16, a process of writing data to the storage unit 12, and a process of reading out stored data from the storage unit 12, depending on the methods of data acquisition and output.

When the processing part 103 executes a process, various conditions occur. For example, the copy process involves reading an image from a document, starting the transport of a medium, forming a toner image on a photoreceptor, and forming an image onto the medium. In addition, copy parameters such as color settings, the scale ratio, and whether or not sorting is enabled are also included in the conditions of the copy process. In the present exemplary embodiment, when the processing part 103 executes a process, the processing part 103 generates status information expressing a status to be reported from among the status of these process conditions, and supplies the generated status information to the notifying part 104.

The status to be reported includes information such as the number of completed copies illustrated in FIGS. 7A and 7B, and parameters such as the sheet size, for example. A list indicating the status information to be reported is stored in the storage unit 12 of the information processing device 10, and the processing part 103 references the storage unit 12 to supply the notifying part 104 with a notification expressing the status information included in the list from among the status information expressing the process conditions. Note that the processing part 103 may also supply status information to the notifying part 104 irrespectively of whether or not the status information is included on the list, and the notifying part 104 may judge whether or not the supplied status information expresses status information included on the list.

[1-3-4] Notifying Means

The notifying part 104 of the information processing device 10 notifies the display device 4 of the status of a process executed by the processing part 103 by communication via the mediating part 101. In the present exemplary embodiment, the notifying part 104 issues a notification using four notification methods from a first to a fourth notification method. In the first and second notification methods, the notifying part 104 reports the status of the process in response to a request from the display device 4. Specifically, when an HTTP request is transmitted from the display device 4 via the mediating part 101, the notifying part 104 reports the status of the process by stating status information supplied from the processing part 103 in an HTTP response to the HTTP request, and transmitting the HTTP response to the display device 4 via the mediating part 101.

In the first notification method, when there is a request for a process (hereinafter called a "process request") issued as an HTTP request from the display device 4, first, the notifying part 104 waits until the execution of the process by the processing part 103 is completed. In other words, the "process" requested at this point is a process conducted by the processing part 103. Subsequently, the notifying part 104 states the status at the time of the completion of the process, or in other words the result of the process, in an HTTP response to the HTTP request that requested the process, and transmits the HTTP response, thereby notifying the display device 4 of the stated result of the process.

In the second notification method, when there is a process request issued as an HTTP request from the display device 4, the notifying part 104 does not wait for the completion of the requested process, and first reports that the process request was received by using an HTTP response to the HTTP request. Thereafter, when an HTTP request stating a request for a notification of the status of the process (hereinafter called a "notification request") is transmitted from the display device 4, the notifying part 104 states status information in an HTTP response to the HTTP request and transmits the HTTP response, thereby reporting the status of the process.

The display device 4 repeatedly issues notification requests using HTTP requests (that is, conducts polling), and the notifying part 104 reports the status of the process in response every time a notification request is received by polling. In the present exemplary embodiment, the display device 4 conducts polling until the result of the process is reported, and the notifying part 104 repeatedly reports the status of the process until reporting the result of the process.

To summarize, when the first notification method is used, the notifying part 104 notifies the display device 4 at the request source of the result of the process by using an HTTP response to the HTTP request that requested the process. Also, when the second notification method is used, the notifying part 104 notifies the display device 4 at the request source of the result of the process or another status report of the process by using separate communication from the HTTP response to the HTTP request that requested the process, or in other words, an HTTP response to the HTTP request that requests a notification. In this way, in the case of using the first and the second notification methods, when there is a request from the display device 4 (a process request or a notification request), the notifying part 104 issues a notification in response to the request (also called a pull notification).

In the case of using the third and fourth notification methods, the notifying part 104 reports the status of the process by communication according to a different standard than an HTTP response. Specifically, the notifying part 104 reports the status of the process by communication based on the WebSocket standard. The third and fourth notification methods are conducted in a state in which the local device (information processing device 10) and the display device 4 have been connected as a result of the mediating part 101 conducting a TCP handshake procedure when the display device 4 transmitted the operating image request data discussed earlier, for example. In this state, when status information is supplied from the processing part 103, for example, the notifying part 104 states the status information in XML data conforming to the WebSocket standard. The notifying part 104 transmits the XML data to the display device 4 via the mediating part 101, thereby reporting the status of the process.

In the third notification method, when there is a process request issued as an HTTP request from the display device 4, as with the second notification method, the notifying part 104 does not wait for the completion of the requested process, and first reports that the process request was received by using an HTTP response to the HTTP request. Thereafter, when status information is supplied from the processing part 103, the notifying part 104 transmits XML data stating the supplied status information to the display device 4 and notifies the display device 4 at the request source of the result of the process or another status report of the process, even if a notification request is not received via an HTTP request.

In other words, when the third notification method is used, the notifying part 104 reports the result of the process or another status report of the process by using separate communication from the HTTP response to the HTTP request that requested the process (in the present exemplary embodiment, communication conforming to the WebSocket standard). This notification is similar to the second notification method in that the result of the process or another status report of the process are reported by using separate communication from the HTTP response to the HTTP request that requests the process. Note that "separate communication" in the second notification method refers to an HTTP response to an HTTP request transmitted from the display device 4 separately from the HTTP request that requests the process, or in other words the HTTP request that requests the notification in the above example.

In the fourth notification method, when status information is supplied from the processing part 103, the notifying part 104 transmits XML data stating the supplied status information and notifies the display device 4 at the request source of the status expressed by the status information, irrespectively of whether or not there is a process request via an HTTP request from the display device 4. When the fourth notification method is used, the notifying part 104 reports a predetermined status, such as "out of toner" or "out of paper", for example. Note that the notifying part 104 may also report the status of a process determined individually for each display device 4.

In this way, when the third and fourth notification methods are used, the notifying part 104 issues an active notification (also called a push notification), irrespectively of whether or not there is a request (process request or notification request) via an HTTP request from the display device 4.

The first, second, and third notification methods are all methods of reporting the status of a requested process (including the result of the process). In the present exemplary embodiment, when the display device 4 requests a process, the display device 4 specifies the method by which to be notified of the result of the process. The notifying part 104 reports the result of the process and the like by using the notification method specified by the display device 4.

[1-3-5] Operating Part

The operating part 200 of the user device 20 and the operating part 300 of the operating device 30 (designated the "operating part 400" when not being distinguished) are parts for operating the information processing device 10. The operating part 400 is realized by the display device 4 executing a browser program, for example. The operating part 200 includes a displaying part 201 and a requesting part 202, while the operating part 300 includes a displaying part 301 and a requesting part 302. The terms "displaying part 401" and "requesting part 402" will be used when not distinguishing between the user device 20 and the operating device 30.

[1-3-5-1] Displaying Part

The displaying part 401 (the displaying part 201 of the user device 20 and the displaying part 301 of the operating device 30) display information and images transmitted from the information processing device 10. For example, the displaying part 401 displays status information stated in XML data transmitted from the notifying part 104 of the information processing device 10 (information expressing the result of a process or another status report of the process). The displaying part 401 displays the status information C1 and C2 illustrated in FIGS. 7A and 7B discussed earlier, for example.

In addition, the displaying part 401 requests the information processing device 10 for an operating image, which is an image that is not stored locally, and temporarily stores and displays an operating image provided in response. When a user performs an operation of accessing a Uniform Resource Locator (URL) of the information processing device 10, for example, the displaying part 401 transmits the operating image request data discussed earlier to the URL, or in other words, to the information processing device 10. When the providing part 102 of the information processing device 10 transmits operating image data in response, the displaying part 401 temporarily stores operating images included in the received operating image data in a local storage area, and displays the operating images. Specifically, the displaying part 401 displays the operating images on the basis of parameters such as the arrangement and sizes of the operating images stated in an HTTP response which acts as the operating image data. The operating image group A1 illustrated in FIG. 6 is an example of operating images displayed in this way.

The operating image group A1 includes, in addition to the operating image A11 discussed earlier (the operating image corresponding to a request for starting copying), operating images for selecting parameters to be used in the copy process. For example, below the character strings "Select Scale", "Select Paper", and "Select Color Mode" illustrated in FIG. 6, operating images for selecting parameters regarding the scale of the image to copy, the paper on which to form the copied image, and the color mode of the copied image are respectively displayed. The parameters are selected by having the user operate these operating images.

The displaying part 401 displays an operating image expressing a selected parameter in a different format from other parameters (in this example, a format that outlines a selected in bold lines is used, but another format such as highlighting may also be used), thereby enabling the user to understand which parameters are selected. The displaying part 401 supplies data relating to the displayed operating images to the requesting part. Data relating to operating images refers to data used to judge whether or not an operating image has been operated, and may be data indicating the area where an operating image is being displayed, for example. In addition, the displaying part 401 supplies data expressing selected parameters to the requesting part.

Additionally, the operating image group A1 includes operating images A12, A13, A14, and A15 that include the character strings "Adjust Quality", "Reading Method", "Output Format", and "Process Status", respectively. When these operating images are operated, different operating images are displayed.

FIGS. 8A and 8B are diagrams illustrating an example of other displayed operating images. FIG. 8A illustrates an operating image group A2 displayed when the operating image A12 illustrated in FIG. 6 is operated. The operating image group A2 includes an operating image A21 that is operated when modifying the "Quality of Original" parameter. The operating image A21 includes the character string "Text/Photo" corresponding to the current parameter.

The operating image group A2 additionally includes operating images A22, A23, A24, A25, and A26 that are operated when modifying the parameters "Copy Density", "Sharpness", "Saturation", "Contrast", and "Quality". FIG. 8B illustrates the operating images displayed when the operating image A22 is operated from among the above. FIG. 8B illustrates an operating image group A3 for modifying a copy density parameter. The operating image group A3 includes an operating image A31 indicating the degree of copy density in nine stages, operating images A32 and A33 that modify the density, an operating image A34 that cancels modification, and an operating image A35 that closes the operating image group A3 and returns to the screen displayed by the operating image group A2.

As above, the displaying part 401 displays the operating image group A2 when the operating image A12 illustrated in FIG. 6 is operated, and displays the operating image group A3 when the operating image A22 is operated. Besides the above, other operating images are also displayed when the operating images A13 to A15 illustrated in FIG. 6 are operated, for example. Of these, when the operating image A15 is operated, the status of the copy process illustrated in FIGS. 7A and 7B is displayed, and the operating images A27 and A28 including the character strings "Cancel Job" and "Close", respectively, are also displayed. If the operating image A27 is operated, the copy process is forcibly terminated, whereas if the operating image A28 is operated, the display returns to the screen illustrated in FIG. 6 and the operating image group A1 is displayed. In this way, the operating images are arranged in a hierarchical structure, so that a number of operating images which may be difficult to display at once may be displayed by successively switching between screens.

[1-3-5-2] Requesting Part

When a user performs an operation on an operating image displayed by the displaying part 401, the requesting part 402 (the requesting part 202 of the user device 20 and the requesting part 302 of the operating device 30) transmits a request corresponding to the user operation to the information processing device 10 via an HTTP request. The requesting part 402 requests the information processing device 10 for a process corresponding to the operation on the operating image, for example (in other words, the process request discussed earlier is transmitted). The process is a process executed by the processing part 103. Also, the requesting part 402 requests the information processing device 10 for a notification of the status and the result of the previously requested process according to an operation on an operating image (in other words, the notification request discussed earlier is transmitted).

For example, when a user taps the touch sensor of the operating unit, the requesting part 402 judges whether or not the tapped position is included in an area where an operating image is being displayed, on the basis of data supplied from the displaying part 401. In the case of judging that the tapped position is included in the area, the requesting part 402 accepts an operation on the operating image being displayed in that area. When an operation is accepted on a request content confirmation image discussed earlier (in the example of FIG. 6, the operating image A11), the requesting part 402 uses the parameters indicated by data supplied from the displaying part 401 to request the information processing device 10 for the process indicated by the request content confirmation image. In the case of performing an operation on the operating image A11 in the state illustrated in FIG. 6, the requesting part 402 requests the information processing device 10 for a process of copying in black and white onto A4 plain paper at a scale of 110%.

Specifically, the requesting part 402 generates XML data indicating an HTTP request stating instructions to conduct the process corresponding to the operated request content confirmation image (in this example, the copy process) using the parameters indicated by data supplied from the displaying part 401 (this statement of instructions is herein designated the "instruction statement"). The requesting part 402 transmits the generated XML data to the information processing device 10, thereby requesting the information processing device 10 for the process via an HTTP request. Hereinafter, XML data that the requesting part 402 transmits to request a process in this way is designated "process request data". Note that when the copy process is requested, process request data including an instruction statement is generated, but depending on the requested process, the process request data may not include an instruction statement in some cases. For example, the process request data does not include an instruction statement when a process of powering off the information processing device 10 is requested.

When the requesting part 402 transmits an HTTP request, an HTTP response is transmitted in response. The requesting part 402 executes this series of processes, including the transmission of an HTTP request and the reception of an HTTP response, and does not accept user operations while these processes are being executed. For example, if the operating image group A1 illustrated in FIG. 6 is being displayed, the judgment of a tapped position or the like is not conducted, even if the user taps the operating images. In other words, the requesting part 402 enters a state of not accepting operations from the user (a so-called frozen state) until an HTTP response is received in response to the HTTP request transmitted by the requesting part 402. After an HTTP response is received, the requesting part 402 once again enters a state of accepting user operations.

When issuing a process request, the requesting part 402 specifies the notification method used to report the status of the process, and requests to be notified by the specified method. Specifically, the requesting part 402 specifies which of the first, second, and third notification methods discussed earlier is to be used. The requesting part 402 states and transmits the specified notification method in the process request data, for example. In this case, the notifying part 104 of the information processing device 10 reports the status of the process by using the notification method stated in the process request data. Note that the requesting part 402 may also state the specified notification method in XML data separate from the process request data, and transmit the XML data to the display device 4 as an HTTP request. In this case, the notifying part 104 reports that the specification of a notification method was received via an HTTP response to the HTTP request, and issues subsequent notifications using the specified notification method, for example.

[1-3-6] Controlling Part

When a process corresponding to an operation on an operating image discussed above (such as the operating image A11 illustrated in FIG. 6, for example) is requested from the display device 4 displaying that operating image, the controlling part 105 of the information processing device 10 controls the processing part 103 to executed the requested process. Specifically, when process request data from the display device 4 is transmitted via the mediating part 101, the controlling part 105 controls the processing part 103 to execute the requested process according to the process request data. In other words, when a process is requested by an HTTP request from the display device 4, the controlling part 105 controls the processing part 103 to execute the requested process. The process request data, which is XML data transmitted from the display device 4 as an HTTP request, is supplied to the controlling part 105 via the mediating part 101.

For example, the controlling part 105 analyzes an instruction statement included in the process request data, and controls the processing part 103 so that the process is executed in accordance with the content of the analyzed instructions. Specifically, the controlling part 105 causes a specified process (for example, the copy process) to be executed with specified parameters. Consequently, the processing part 103 reads an image from a medium according to an image quality and reading method determined by user operations, and forms the read image according to an output format, scale, paper, and color mode determined by user operations, for example.

When causing a process to be executed, the controlling part 105 issues a transaction ID as information that identifies the process to be executed. The controlling part 105 causes the storage unit 12 to store the issued transaction ID and the communication recipient of the device 4 at the request source in association with each other. When causing a process to be executed, the controlling part 105 supplies the issued transaction ID to the processing part 103, and the processing part 103 supplies the status information discussed earlier together with the transaction ID to the notifying part 104.

In addition, the controlling part 105 also causes the notification method stated in the process request data (one among the first to third notification methods) to be stored in association with the transaction ID. The notifying part 104 transmits, to the communication recipient associated with the transaction ID supplied from the processing part 103, XML data stating status information supplied together with the transaction ID. At this point, by having the notifying part 104 transmit the XML data according to the notification method associated with the transaction ID, a notification is issued according to the specified notification method.

[1-4] Hierarchical Structure

The configuration of the information processing system 1 will now be described with reference to FIGS. 9 and 10, which illustrate the configuration in a hierarchical structure.

Figure 9:
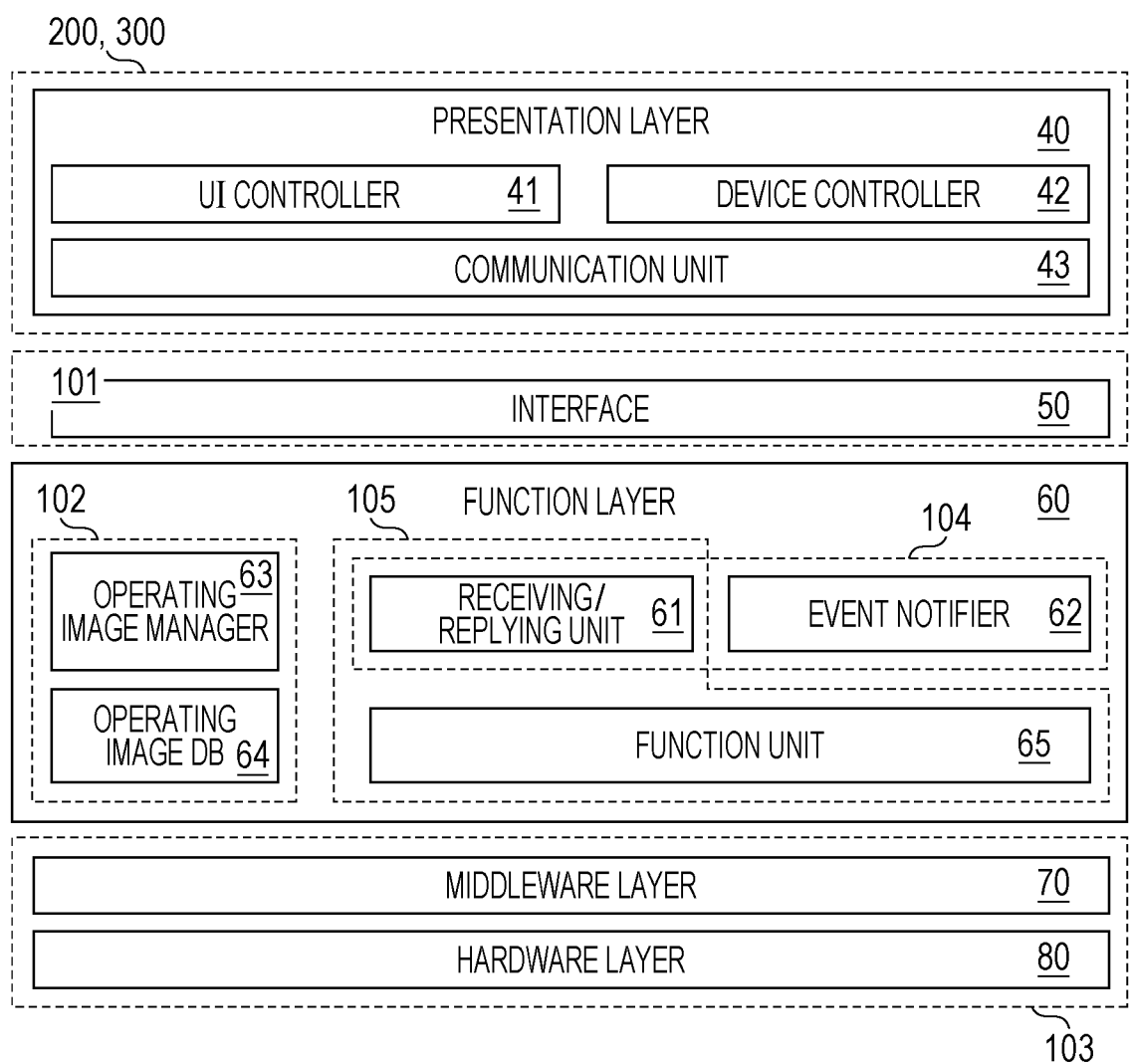
FIG. 9 is a diagram illustrating an example of a hierarchical structure expressing a configuration of an information processing system.

FIG. 9 is a diagram illustrating an example of a hierarchical structure expressing a configuration of the information processing system 1. The information processing system 1 is equipped with a presentation layer 40, an interface 50, a function layer 60, a middleware layer 70, and a hardware layer 80. The presentation layer 40 is the layer that realizes the function of accepting operations by a user (also referred to as the user interface), and functions as the operating part 400 illustrated in FIG. 5.

The presentation layer 40 is equipped with a UI controller 41, a device controller 42, and a communication unit 43. The UI controller 41 is the portion that controls the user interface, and displays the operating images or status information discussed earlier, and accepts user operations. The UI controller 41 is realized by the displaying part 401 illustrated in FIG. 5. The device controller 42 requests the information processing device 10 for a process as above on the basis of a user operation, and controls the function layer 60 discussed later. The device controller 42 is realized by the requesting part 402. The communication unit 43 controls communication that the UI controller 41 and the device controller 42 conduct with the information processing device 10.

The interface 50 is a layer that realizes a function of mediating connections between the presentation layer 40 and the function layer 60. Connections between the presentation layer 40 and the interface 50 includes the case of going through an external device having a communication function, such as the communication equipment 3 illustrated in FIG. 1 (a connection with the user device 20), and the case of not going through such an external device (a connection with the operating device 30). The function layer 60 is a layer that realizes a function of manipulating data according to the intended purpose, such as the copy function or the scan function. The middleware layer 70 is a layer that executes general processes intermediate between the function layer 60 and the hardware layer 80. The hardware layer 80 is the layer that physically realizes processes such as image reading and image forming.

The function layer 60 is equipped with a receiving/replying unit 61, an event notifier 62, an operating image manager 63, an operating image database (DB) 64, and a function unit 65 that provides functions such as the copy function and the scan function. The receiving/replying unit 61 receives a request for a process indicated by process request data transmitted from the presentation layer 40 via the interface 50, and requests the function unit 65 for the process. At this point, the receiving/replying unit 61 also issues the transaction ID discussed earlier. In addition, the receiving/replying unit 61 transmits response data indicating a response to a received request to the presentation layer 40 via the interface 50. The response data may indicate only that the request was received in some cases, or indicate status information in some cases. In other words, the receiving/replying unit 61 also issues a notification of the status of a process, and this notification is a pull notification according to the first or second notification method discussed earlier.

The event notifier 62 is supplied with status information via the function unit 65. The event notifier 62 states the supplied status information in XML data conforming to WebSocket, and transmits the XML data to the presentation layer 40 via the interface 50. In other words, the notification issued by the event notifier 62 is a push notification according to the third or fourth notification method discussed earlier. The operating image manager 63 manages operating images transmitted to the presentation layer 40. The operating image DB 64 is a database that stores operating images. The function unit 65 includes module groups for realizing functions that the information processing device 10 provides to a user.

Figure 10:
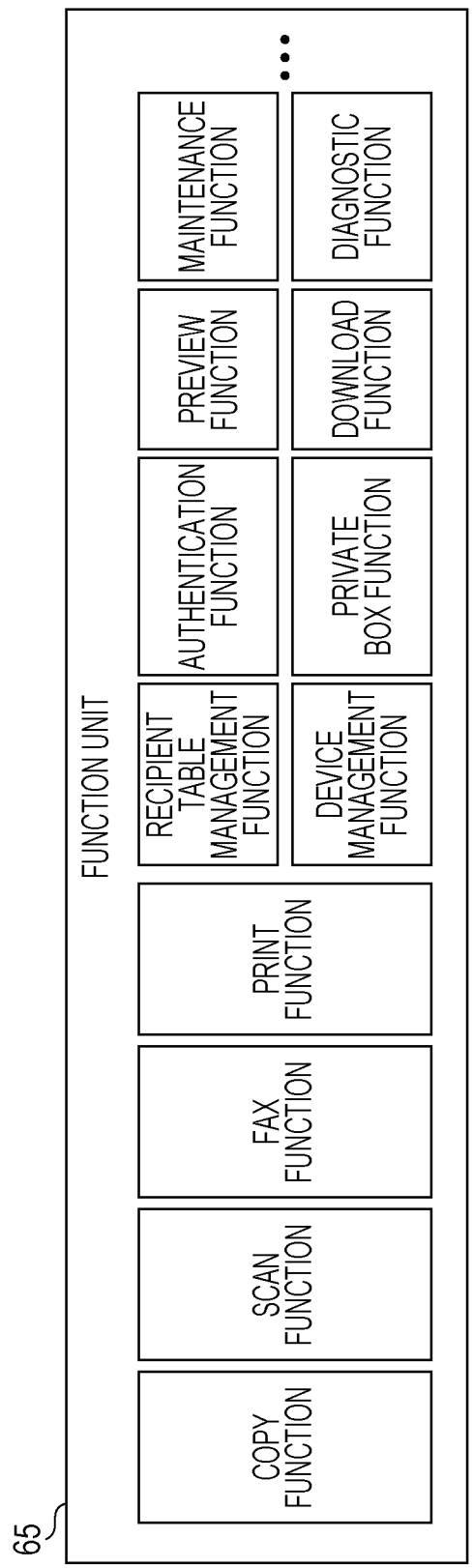
FIG. 10 is a diagram illustrating an example of module groups included in a function unit.

FIG. 10 is a diagram illustrating an example of module groups included in the function unit 65. The function unit 65 includes respective modules for realizing a copy function, a scan function, a fax function, a print function, a recipient table management function (a function of managing recipient information), a device management function (a function of managing the state of an original being placed on the image reading unit 13, the states of media and consumables in the image forming unit 14, and the like), an authentication function, a private box function (a function of managing electronic documents stored in the information processing device 10), a preview function, a download function (a function of controlling program updates), a maintenance function (a function of performing maintenance on hardware in accordance with remote requests), and a diagnostic function (a function of diagnosing hardware issues).

The interface 50 illustrated in FIG. 9 functions as the mediating part 101 illustrated in FIG. 5. The operating image manager 63 and the operating image DB 64 cooperate to function as the providing part 102, while the middleware layer 70 and the hardware layer 80 cooperate to function as the processing part 103. In addition, the receiving/replying unit 61 and the event notifier 62 cooperate to function as the notifying part 104, while the receiving/replying unit 61 and the function unit 65 cooperate to function as the controlling part 105.

Figure 11:
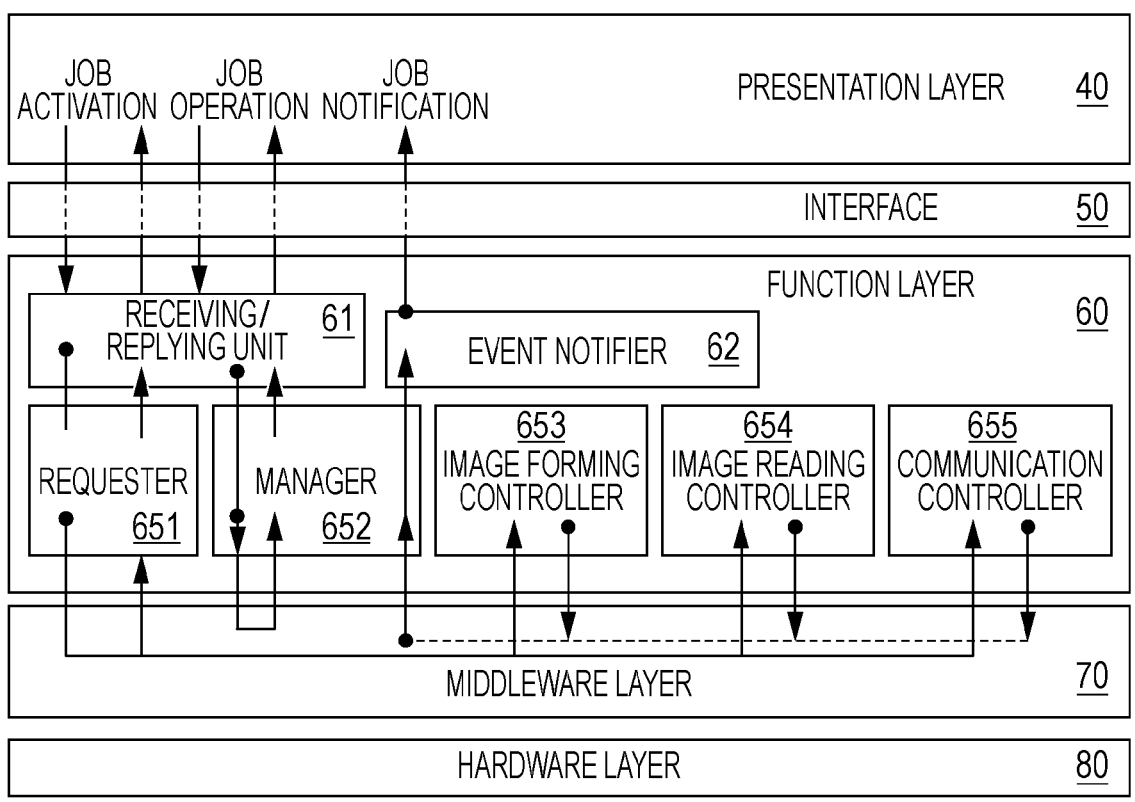
FIG. 11 is a diagram illustrating an example of a hierarchical structure expressing a configuration of an information processing system.

FIG. 11 is a diagram illustrating an example of a hierarchical structure expressing a configuration of the information processing system 1. The module groups illustrated in FIG. 10 respectively include a controller (hereinafter called a "usage controller") used in each module from among a requester 651, a manager 652, an image forming controller 653, an image reading controller 654, and a communication controller 655. For example, when realizing the copy function, the image forming controller 653 and the image reading controller 654 become the usage controllers, whereas when realizing the print function, the image forming controller 653 becomes the usage controller. Hereinafter, the role of each module will be described by taking an example in which the module that realizes the print function is executed.

When a user performs an operation requesting the printing of an image, request data requesting the launch of a job is transmitted from the presentation layer 40 to the function layer 60 via the interface 50. The receiving/replying unit 61 receives the request data, analyzes the received request data, and supplies request data to the requester 651 of the module corresponding to the content of the request (in this example, the requester 651 of the print function). The requester 651 analyzes the supplied request data, and requests the middleware layer 70 to generate a job. The middleware layer 70 conducts a process of generating the requested job, and notifies the requester 651 of the process result. The requester 651 notifies the presentation layer 40 of the reported process result via the receiving/replying unit 61 and the interface 50.

The presentation layer 40 displays a reported process result. In addition, the middleware layer 70 supplies the generated job to the above usage controller (in the case of the print function, the image forming controller 653). The usage controller generates a user job expressed in a format that presents the supplied job to the user, and supplies data indicating the content of the user job to the manager 652 via the middleware layer 70. The manager 652 generates XML data indicating the content of the user job indicated by the supplied data. The content of the user job corresponds to the status information discussed earlier, and the XML data generated by the manager 652 is the status information data discussed earlier. The manager 652 transmits the generated status information data to the presentation layer 40 via the event notifier 62 and the interface 50. In this way, a push notification related to the job is issued.

When a user performs an operation requesting a process such as pausing, aborting, or continuing a job, or changing the job queue, request data requesting such processes is transmitted from the presentation layer 40 to the function layer 60 via the interface 50. The receiving/replying unit 61 receives the request data, analyzes the received request data, and supplies request data to the manager 652 of the module corresponding to the content of the request (in this example, the manager 652 of the print function). The manager 652 analyzes the supplied request data, and requests the middleware layer 70 to conduct the requested process. The middleware layer 70 conducts the requested process, and notifies the manager 652 of the process result. The manager 652 notifies the presentation layer 40 of the reported process result via the receiving/replying unit 61 and the interface 50. The presentation layer 40 displays a reported process result.

[1-5] Action

[1-5-1] Action Based on User Operation

The information processing system 1, on the basis of the above configuration, conducts an execution process of executing a process such as image forming according to a user operation. The actions conducted by the devices provided in the information processing system 1 during the execution process will now be described with reference to FIGS. 12 and 13.

Figure 12:
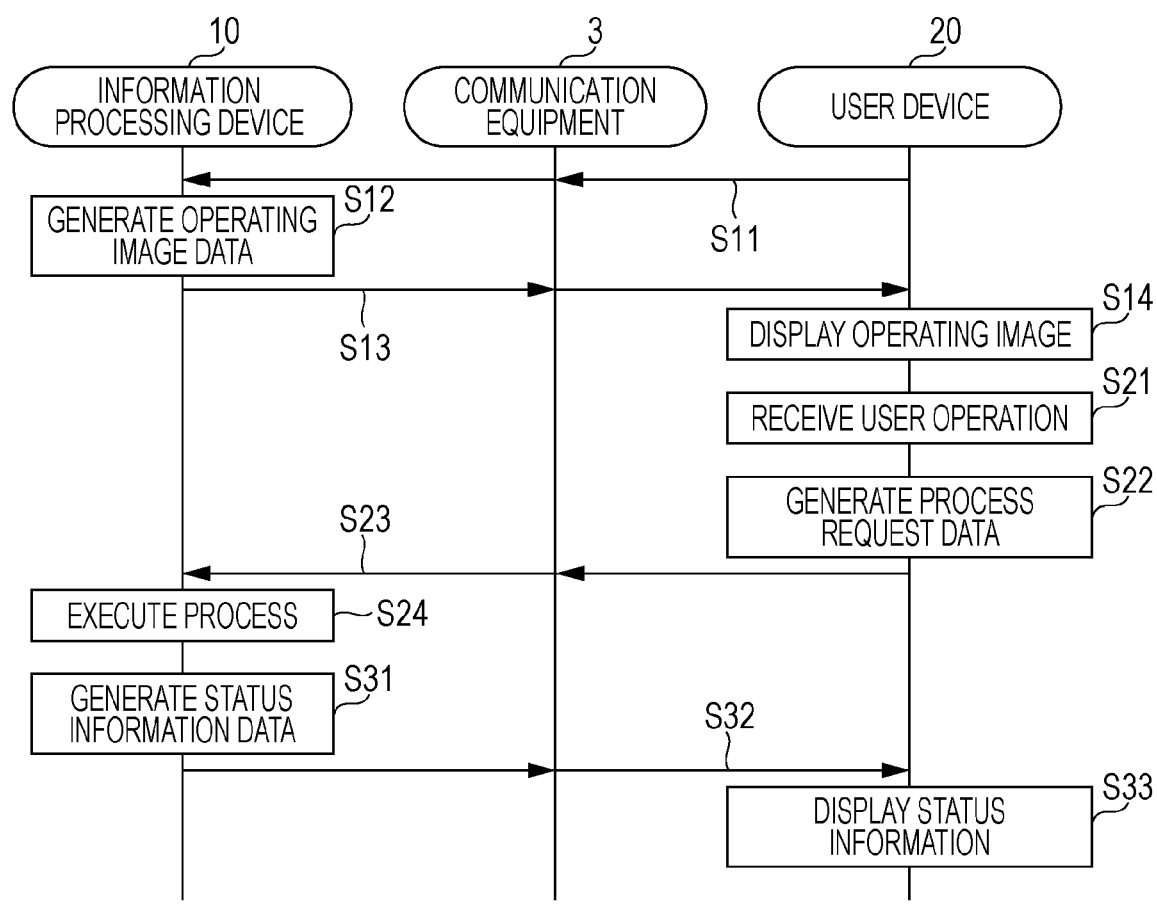
FIG. 12 is a sequence diagram illustrating an example of the action of respective devices in an execution process.

FIG. 12 is a sequence diagram illustrating an example of the action of respective devices in an execution process. In the example of FIG. 12, the case of a user operating the user device 20 will be described. The execution process is started when triggered as a result of the user operating the user device 20 to launch a browser and access a URL of the information processing device 10.

First, the user device 20 transmits request data requesting an operating image to the information processing device 10 via the communication equipment 3 (step S11). The information processing device 10 receives the request data, generates operating image data including an operating image requested by the request data (step S12), and transmits the operating image data to the user device 20 via the communication equipment 3 (step S13). The user device 20 stores an operating image included in the received operating image data in a local storage area, and displays an operating image (step S14). Steps S11 and S14 are actions conducted by the displaying part 301, while steps S12 and S13 are actions conducted by the providing part 102.

Next, if the user performs an operation on a displayed operating image, the user device 20 receives the user operation (step S21). If a user operation on a request content confirmation image (for example, the operating image A11 illustrated in FIG. 6) is received in step S21, the user device 20 generates process request data indicating a request of a process determined by the operation on the operating image (step S22), and transmits the process request data to the information processing device 10 via the communication equipment 3 (step S23). The information processing device 10 receives the process request data, and executes a process according to the instructions indicated by the process request data (step S24). Steps S21, S22, and S23 are actions conducted by the requesting part 302. Step S24 is an action conducted by the cooperation of the processing part 103 and the controlling part 105.

Every time the status of the process is updated, for example, the information processing device 10 generates the status information data discussed earlier (step S31), and transmits the status information data to the user device 20 via the communication equipment 3 (step S32). When status information data is transmitted, the user device 20 displays the status information indicated by the status information data (step S33). Steps S31 and S32 are actions conducted by the notifying part 104, while step S33 is an action conducted by the displaying part 301. Also, the communication in steps S11, S13, S23, and S32 is conducted in all cases by the mediating part 101 and the communication equipment 3.

Figure 13:
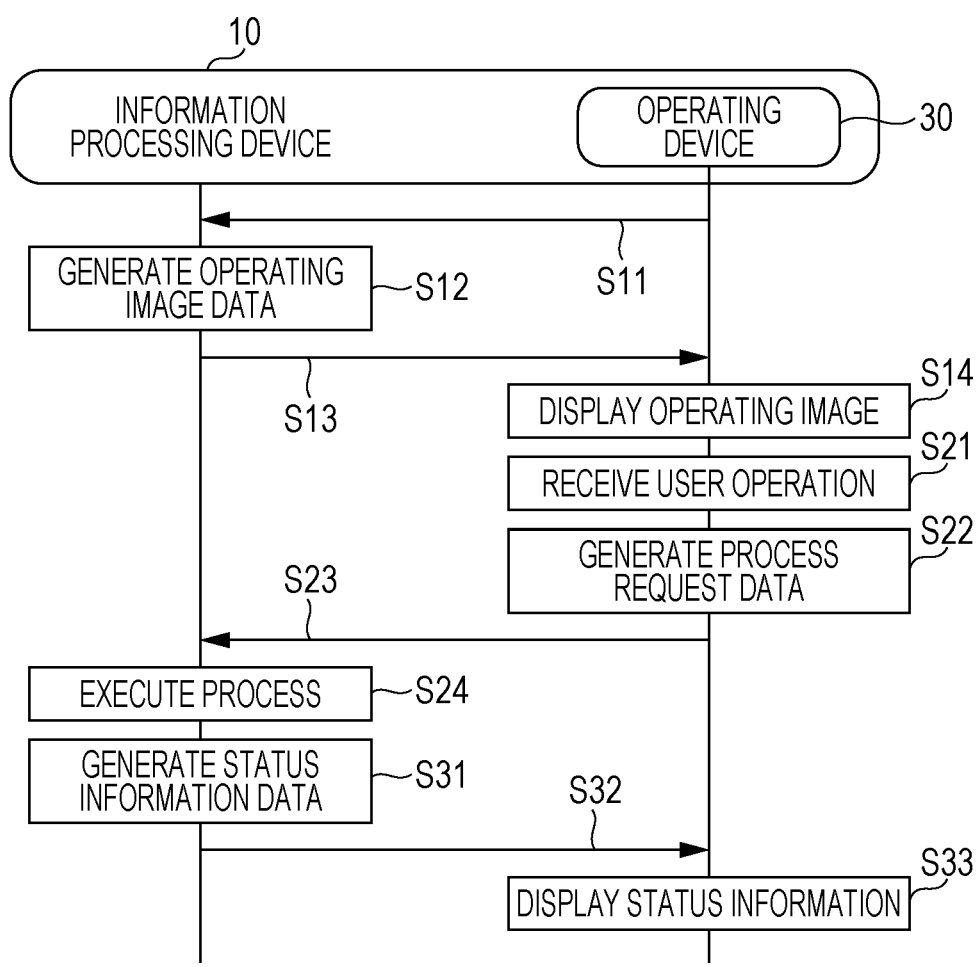
FIG. 13 is a sequence diagram illustrating another example of the action of respective devices in an execution process.

FIG. 13 is a sequence diagram illustrating another example of the action of respective devices in an execution process. FIG. 13 illustrates a case of a user operating the operating device 30. Likewise in this case, the actions in the steps illustrated in FIG. 12 are conducted, except that the actions that were conducted by the user device 20 are conducted by the operating device 30. Also, the communication in steps S11, S13, S23, and S32 is conducted in all cases via the mediating part 101 but without going through the communication equipment 3.

[1-5-2] Action in Four Notification Methods

Figure 14:
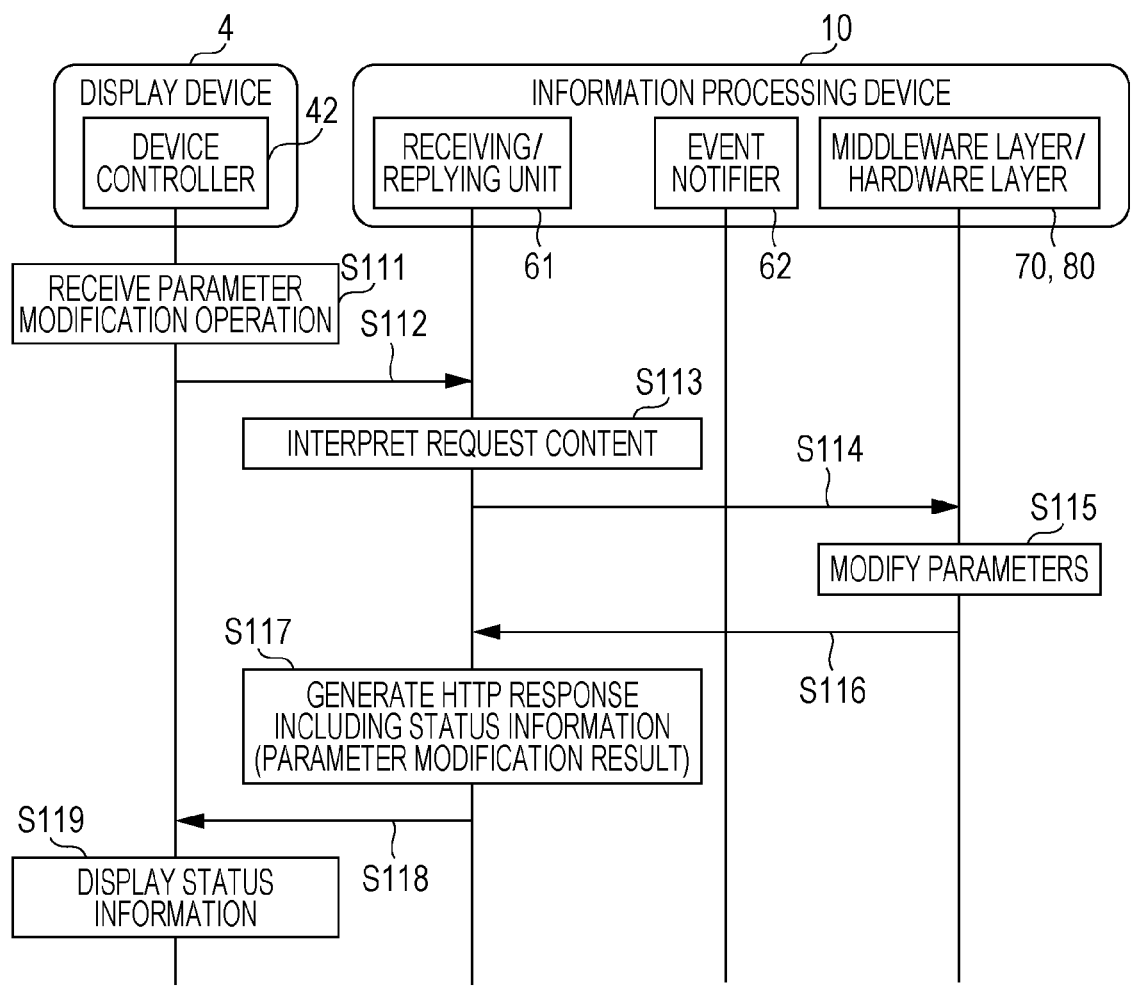
FIG. 14 is a sequence diagram illustrating an example of the action of respective devices when a first notification method is used.
Figure 15:
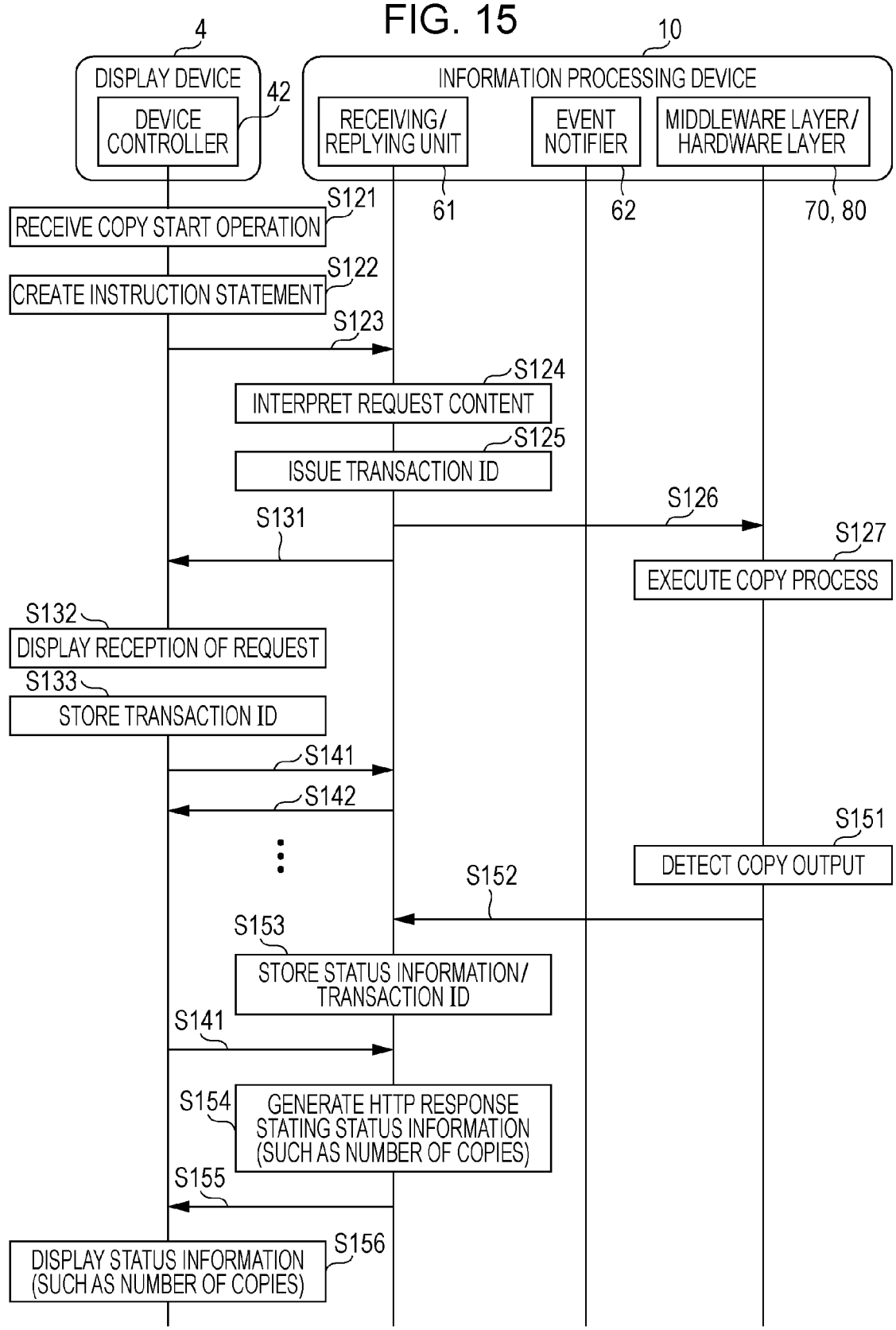
FIG. 15 is a sequence diagram illustrating an example of the action of respective devices when a second notification method is used.
Figure 16:
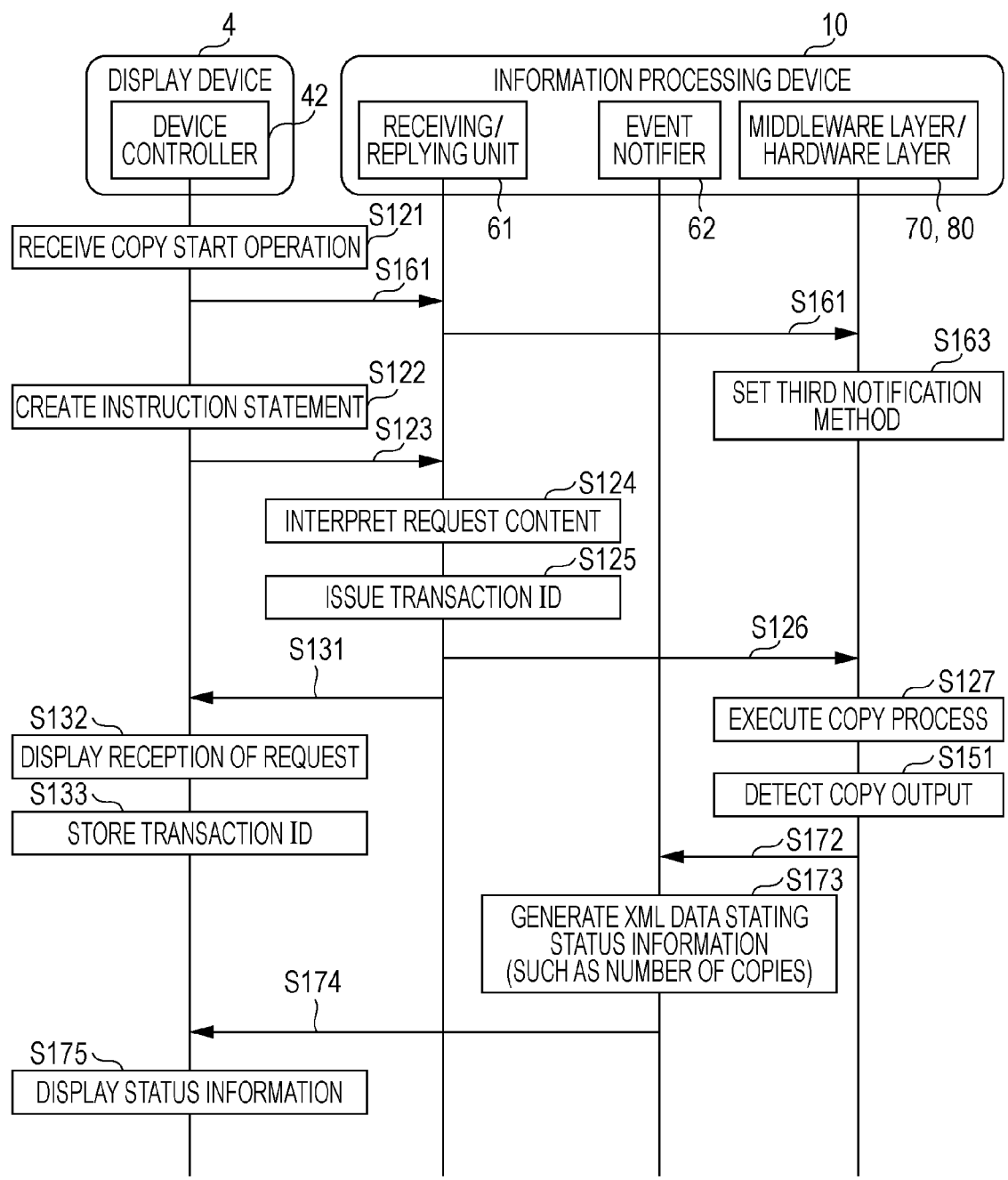
FIG. 16 is a sequence diagram illustrating an example of the action of respective devices when a third notification method is used.
Figure 17:
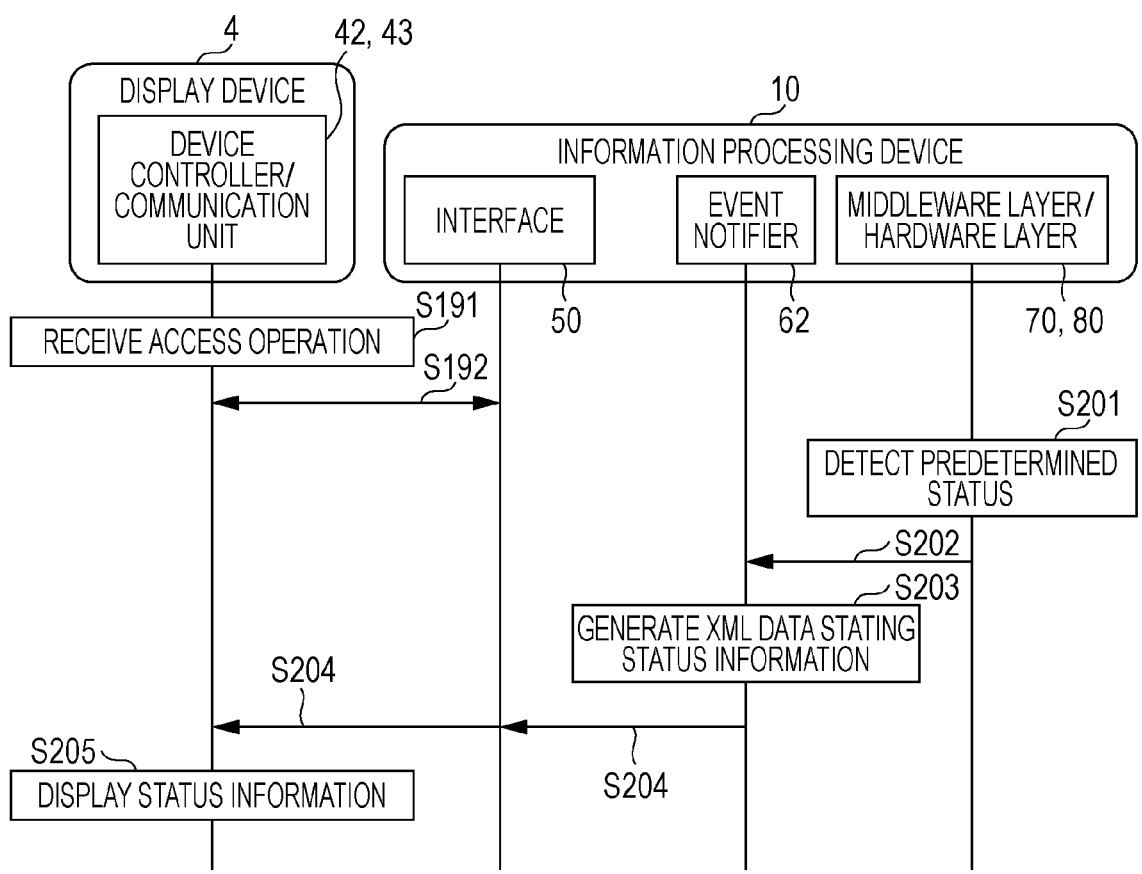
FIG. 17 is a sequence diagram illustrating an example of the action of respective devices when a fourth notification method is used.

Hereinafter, the actions conducted by each device when the notifying part 104 of the information processing device 10 reports the status according to the first to the fourth notification methods discussed earlier will be described with reference to FIGS. 14 to 17. FIGS. 14 to 16 each illustrate the device controller 42 of the display device 4 and the receiving/replying unit 61, the event notifier 62, the middleware layer 70, and the hardware layer 80 of the information processing device 10 as the agents of action. In FIG. 17, among these agents of action, the receiving/replying unit 61 is replaced by the interface 50.

FIG. 14 is a sequence diagram illustrating an example of the action of respective devices when the first notification method is used. The action illustrated in FIG. 14 is started when triggered by the user performing an operation of modifying a copy parameter (such as the scale, paper size, or color mode) before copying, for example. First, the device controller 42 of the display device 4 receives an operation of modifying a parameter (step S111), and transmits XML data stating a request to modify a parameter (the process request data in this example) to the information processing device 10 (step S112). Step S111 corresponds to step S21 (receiving a user operation) in FIGS. 12 and 13, while step S112 corresponds to steps S22 and S23 (generating and transmitting process request data).

The receiving/replying unit 61 of the information processing device 10 receives the XML data, interprets the content of the request stated in the XML data (step S113), and instructs the middleware layer 70 of the information processing device 10 to execute a process according to the interpreted content (step S114). The middleware layer 70 cooperates with the hardware layer 80 to execute the process as instructed, or in other words, to modify a parameter (step S115). Steps S113 to S115 correspond to step S24 (executing a process) illustrated in FIGS. 12 and 13.

The middleware layer 70 and the hardware layer 80 supply information expressing the result of the process to the receiving/replying unit 61 as status information (step S116). The receiving/replying unit 61 generates XML data (status information data in this example) stating the supplied status information (in this example, the parameter modification result) (step S117), and transmits the XML data to the display device 4 which is the source of the process request (step S118). The device controller 42 of the display device 4 causes a local display unit to display the status information stated in the transmitted XML data (step S119). Steps S116 and S117 correspond to step S31 (generating status information data) illustrated in FIGS. 12 and 13. Step S118 corresponds to step S32 (transmitting status information data), while step S119 corresponds to step S33 (displaying status information).

FIG. 15 is a sequence diagram illustrating an example of the action of respective devices when the second notification method is used. The action illustrated in FIG. 15 is started when triggered by a user placing a document on the image reading unit 13 of the information processing device 10, and performing an operation to start copying on the display device 4, for example. First, the device controller 42 of the display device 4 receives the operation to start copying (step S121), and creates an instruction statement according to the received operation (step S122). The device controller 42 transmits process request data stating the created instruction statement to the information processing device 10 via the communication unit 43 illustrated in FIG. 9 (step S123). The receiving/replying unit 61 of the information processing device 10 receives the process request data via the interface 50 illustrated in FIG. 9, interprets the content of the requested process on the basis of the stated instruction statement (step S124), and issues a transaction ID corresponding to the process (step S125).

The receiving/replying unit 61 generates information expressing instructions of the process on the basis of the interpreted content of the process (in this example, a copy job; hereinafter called "instruction information"), and supplies the instruction information together with the transaction ID to the middleware layer 70 (step S126). The middleware layer 70 and the hardware layer 80 cooperate to execute a process (copy process) based on the supplied instruction information (step S127). After supplying the instruction information, the receiving/replying unit 61 transmits XML data stating information indicating that the request for the copy process was received (for example, the character string "Copy received.") and the issued transaction ID to the display device 4 as an HTTP response (step S131). Note that the action of step S131 may also be executed in parallel with or prior to the action of step S126. The device controller 42 of the display device 4 references the HTTP response, causes a local display unit to display the information indicating that the request was received (step S132), and causes a local storage unit to store the transaction ID (step S133).

After receiving a response to the request for the copy process, the device controller 42 of the display device 4 transmits, as an HTTP request, XML data stating a notification request requesting a notification of the status of the copy process and the transaction ID stored in step S133 (step S141). If status information about the copy process associated with the transaction ID has not been supplied yet, the receiving/replying unit 61 of the information processing device 10 transmits an HTTP response stating as much to the display device 4 (step S142). The action of steps S141 and S142 are conducted repeatedly.

When a copy (an image expressing the scanned document) is output on a medium, the middleware layer 70 of the information processing device 10 senses the output (step S151), associates status information indicating that a copy was output to a medium with the transaction ID supplied in step S126, and supplies the associated status information and transaction ID to the receiving/replying unit 61 (step S152). The receiving/replying unit 61 causes the storage unit 12 to store the supplied status information and transaction ID (step S153). When an HTTP request stating a notification request and a transaction ID is received after step S153 (step S141), the receiving/replying unit 61 reads out the status information associated with the transaction ID stated in the HTTP request, and generates an HTTP response stating the status information (step S154).

After the receiving/replying unit 61 transmits the generated HTTP response to the display device 4 (step S155), the device controller 42 of the display device 4 causes a local display unit to display the status information stated in the HTTP response as in step S132 (step S156). As discussed above, by associating information related to the process requested by the display device 4 with a transaction ID, the display device 4 which is the source of the process request is notified of the status of the process. Thereafter, the action from steps S151 to S156 is repeated until the result of the process is reported when the copy process is completed.

FIG. 16 is a sequence diagram illustrating an example of the action of respective devices when the third notification method is used. The action illustrated in FIG. 16 is started when triggered by a user performing an operation to start copying, as in FIG. 15. First, when the operation to start copying is received (step S121), the device controller 42 of the display device 4 transmits to the information processing device 10 XML data stating that push notifications by the event notifier 62, or in other words the third notification method is specified (step S161). The receiving/replying unit 61 of the information processing device 10 receives the XML data, and informs the middleware layer 70 that the XML data states that the third notification method is specified (step S162).

The middleware layer 70 receives the indicated specification, and configures a setting to issue future notifications to the display device 4 according to the third notification method (step S163). For example, the middleware layer 70 switches a flag indicating whether or not to use the third notification method to ON. In this way, in the example of FIG. 16, the notification method is specified by separate XML data from the process request data. Note that the device controller 42 of the display device 4 may also state the specified notification method in the process request data. In this case, the third notification method is configured by reporting that the third notification method is specified when the receiving/replying unit 61 supplies the middleware layer 70 with instruction information and a transaction ID in step S126.

Next, the action from steps S122 to S127 and the action from steps S131 to S133 illustrated in FIG. 15 are conducted. Subsequently, when the middleware layer 70 and the hardware layer 80 of the information processing device 10 conduct the action of step S151 (sensing copy output), since the flag discussed above is switched to ON, the status information indicating the status of a copy being output to a medium and the transaction ID are supplied to the event notifier 62 rather than the receiving/replying unit 61 (step S172). The event notifier 62 generates XML data stating the supplied status information (such as the number of copies) and the transaction ID (step S173), and transmits the XML data to the display device 4 (step S174). The device controller 42 of the display device 4 causes a local display unit to display the content stated in the XML data (for example, the status information C1 illustrated in FIG. 7A) (step S175).

Thereafter, the action in step S151 and steps S172 to S175 is repeated until the result of the process is reported when the copy process is completed.

FIG. 17 is a sequence diagram illustrating an example of the action of respective devices when the fourth notification method is used. The action illustrated in FIG. 17 is started when triggered as a result of a browser being launched on the display device 4 and an operation of accessing the information processing device 10 (such as inputting a URL or selecting a bookmark) being performed. First, the device controller 42 of the display device 4 receives the access operation (step S191), and cooperates with the communication unit 43 to make a connection conforming to the Web-Socket standard with the interface 50 of the information processing device 10 (step S192).

Thereafter, when a predetermined status (such as "out of toner" or "out of paper") occurs in the information processing device 10, the middleware layer 70 and the hardware layer 80 of the information processing device 10 cooperate to sense the predetermined status (step S201), and supply status information expressing the sensed status to the event notifier 62 (step S202). The event notifier 62 generates XML data stating the supplied status information (step S203), and transmits the XML data via the interface 50 to the display device 4 making the WebSocket connection (step S204). The device controller 42 of the display device 4 causes a local display unit to display the status information stated in the XML data received in step S204 (step S205).

Note that, as discussed earlier, a different status may be reported to each display device 4. In this case, after step S192, the device controller 42 transmits XML data stating the status to be reported to the local device to the information processing device 10 via the communication unit 43. The event notifier 62 receives the XML data via the interface 50, and stores the status to report in association with an address of the display device 4. The event notifier 62 reports the status when the status information supplied in step S202 expresses the stored status to be reported.

[1-6] Provision of Operating Image with Possibility of being Displayed

When providing operating images, the providing part 102 of the information processing device 10 may not only provided operating images to be displayed, but also operating images with a possibility of being displayed. For example, suppose that the operating image group A1 illustrated in FIG. 6 is the group of operating images that are displayed first when the displaying part 401 accesses the URL of the information processing device 10. First, the displaying part 401 transmits operating image request data, and in response, the providing part 102 transmits operating image data including the operating image group A1 illustrated in FIG. 6 as well as the operating image group A2 illustrated in FIG. 8A.

The displaying part 401 causes local storage (either or both of RAM and a storage unit) to store the operating image groups A1 and A2 included in the received operating image data, and causes a local display unit to display the operating image group A1 from among the stored operating image groups. After that, if an operation of selecting the operating image A12 is performed, the displaying part 401 reads out the stored operating image group A2 from the storage unit for display. In this way, the providing part 102 provides in advance a second operating image (in this example, the operating image group A2) that is displayed as a result of an operation performed on a first operating image (in this example, the operating image group A1) being displayed on the display device 4.

Provided that the operating image A12 is a first operating image, an operating image included in the operating image group A2 is a second operating image. There also exist second operating images in the case of treating the operating image A13, A14, or A15 included in the operating image group A1 as a first operating image. The providing part 102 provides these second operating images in advance within a range not exceeding a quantity predetermined as an upper limit. The quantity of operating images referred to herein is expressed as a number of image files representing operating images, a data size of operating images, or the like.

In the present exemplary embodiment, the providing part 102 provides second operating images within a range not exceeding an upper limit determined according to the size of a usable storage area in the display device 4. An upper limit table associating sizes of the storage area with upper limits on the second operating images is stored in a storage unit of the display device 4.

FIG. 18 illustrates an example of an upper limit table. In this example, the numbers "10", "20", and "30" of image files representing operating images are respectively associated as upper limits for the storage area sizes "less than 100 MB", "at least 100 MB, less than 300 MB", and "at least 300 MB" (where MB denotes megabytes).

The displaying part 401 of the display device 4 acquires information expressing the size of the usable storage area from the operating system of the local device, for example, and states the acquired information in the operating image request data. The providing part 102 references the upper limit table, and reads out the upper limit associated with the size of the usable storage area expressed by the information stated in the operating image request data. For example, if the size of the usable storage area is 200 MB, the providing part 102 reads out an upper limit of "20". At this point, suppose that when the operating image A12 is treated as the first operating image, the second operating images are the six from A21 to A26 illustrated in FIG. 8A, and when the operating images A13, A14, and A15 are treated as the first operating image, there are seven, eight, and two second operating images, respectively.

The providing part 102 decides what to provide from among these multiple second operating images (which second operating images to provide) within a range not exceeding the upper limit of "20" that was read out. For example, the providing part 102 adds up the respectively corresponding numbers of second operating images in the order of the operating images A12, A13, A14, and A15, and decides to provide the sum of second operating images reached before exceeding "20". In this example, the operating images corresponding to the operating images A12 and A13 (6+7=13 images) are decided to be provided. If the size of the usable storage area is less than 100 MB, the providing part 102 reads out the upper limit of "10" and decides to provide the operating images corresponding to the operating image A12 (6 images), whereas if the size of the usable storage area is at least 300 MB, the providing part 102 reads out the upper limit of "30" and decides to provide the operating images corresponding to the operating images A12, A13, A14, and A15 (6+7+8+2=23 images).

FIG. 19 illustrates another example of an upper limit table. In this example, the data sizes "20 MB", "40 MB", and "80 MB" of operating images are respectively associated as upper limits for the storage area sizes "less than 100 MB", "at least 100 MB, less than 300 MB", and "at least 300 MB". The providing part 102 reads out an upper limit as discussed in the description of FIG. 18, and decides what to provide within a range not exceeding the upper limit that was read out. For example, suppose that when the operating images A12, A13, A14, and A15 are treated as the first operating image, the data size of the second operating images is 10 MB, 5 MB, 15 MB, and 20 MB, respectively.

If the size of the usable storage area is less than 100 MB, the providing part 102 reads out the upper limit of "20 MB" and decides to provide the operating images corresponding to the operating images A12 and A13 (10+5=15 MB), whereas if the size of the usable storage area is at least 300 MB, the providing part 102 reads out the upper limit of "80 MB" and decides to provide the operating images corresponding to the operating images A12, A13, A14, and A15 (10+5+15+20=50 MB).

Note that in the above example, the providing part 102 adds up the respectively corresponding operating images to provide in the order of the operating images A12, A13, A14, and A15, but a different order may also be used. Also, the order may be fixed, or changed every time operating images are provided. For example, the first operating images may be rotated to the last so that the next order after A12, A13, A14, A15 becomes A13, A14, A15, A12, or the order may be changed randomly. Also, instead of deciding what to provide in units of second operating images corresponding to a first operating image, the second operating images to provide may be decided right up to the upper limit. For example, when the upper limit is "20" in the upper limit table illustrated in FIG. 18, the operating images corresponding to the operating images A12 and A13 (6+7=13 images) may be decided together with 7 of the 8 operating images corresponding to the operating image A14, so that the upper limit of 20 second operating images are decided to be provided.

In the present exemplary embodiment, as discussed above, by providing operating images with a possibility of being displayed to the display device 4 for storage in advance, when an operating image is operated, the next operating image is read out from the storage area of the display device 4. For this reason, operating images are displayed more quickly compared to the case of providing each one from the information processing device 10. On the other hand, if many operating images are stored in advance, the amount of free space in the storage area of the display device 4 decreases, leaving correspondingly less space in the storage area available for other processes, and there is a risk of slower processing or errors related to insufficient memory. In the present exemplary embodiment, since operating images with a possibility of being displayed are provided within a range not exceeding an upper limit as described above, the decrease of free space in the area where the operating images are stored (in other words, the storage area of the display device 4) is moderated compared to the case of providing the operating images without limits.

In addition, if operating images with a possibility of being displayed are stored in advance, there is a risk of running out of free space in the storage area of the display device 4. However, in the present exemplary embodiment, since the information processing device 10 decides an upper limit according to the usable storage area in the display device 4, by deciding an upper limit so that free space in the storage area does not run out, the free space in the area where operating images are stored (in other words, the storage area of the display device 4) does not run out, even if the provided operating images are stored.

[2] Exemplary Modifications

The exemplary embodiment discussed above is merely an example of carrying out the present invention, and may also be modified as follows. Also, the exemplary embodiment discussed above and each exemplary modification indicated below may also be carried out in combination as appropriate.

[2-1] Communication Standard

In the exemplary embodiment, the user device 20 is equipped with a communication unit that conducts wireless communication conforming to a wireless LAN standard, but the user device 20 is not limited thereto, and may also be equipped with a communication unit that conducts communication conforming to a wired LAN standard like the communication unit 33 of the operating device 30, for example. In this case, the user device 20 is connected via a communication cable to a device such as a wired LAN router or hub. The communication unit of the user device 20 in this case still functions as a communicating part that communicates with the other communication device discussed earlier (a communication device different from the information processing device 10, such as a router or hub, for example).

Additionally, in the exemplary embodiment, the first communication unit 15 of the information processing device 10 and the communication unit 33 of the operating device 30 conduct communication conforming to a wired LAN standard, but are not limited thereto, and may also conduct communication conforming to a standard such as Universal Serial Bus (USB) or High-Definition Multimedia Interface (HDMI), or alternatively, conduct wireless communication conforming to a standard such as wireless LAN, Bluetooth (registered trademark), or near field communication (NFC), for example. In any case, the communication unit 33 of the operating device 30 communicates with the first communication unit 15 of the information processing device 10 without going through another communication device such as a router or hub.

[2-2] Configuration of Operating Device

In the exemplary embodiment, the operating device 30 is equipped with the controller 31 and the storage unit 32 as illustrated in FIG. 2, but the operating device 30 may also not be equipped with these components.

Figure 20:
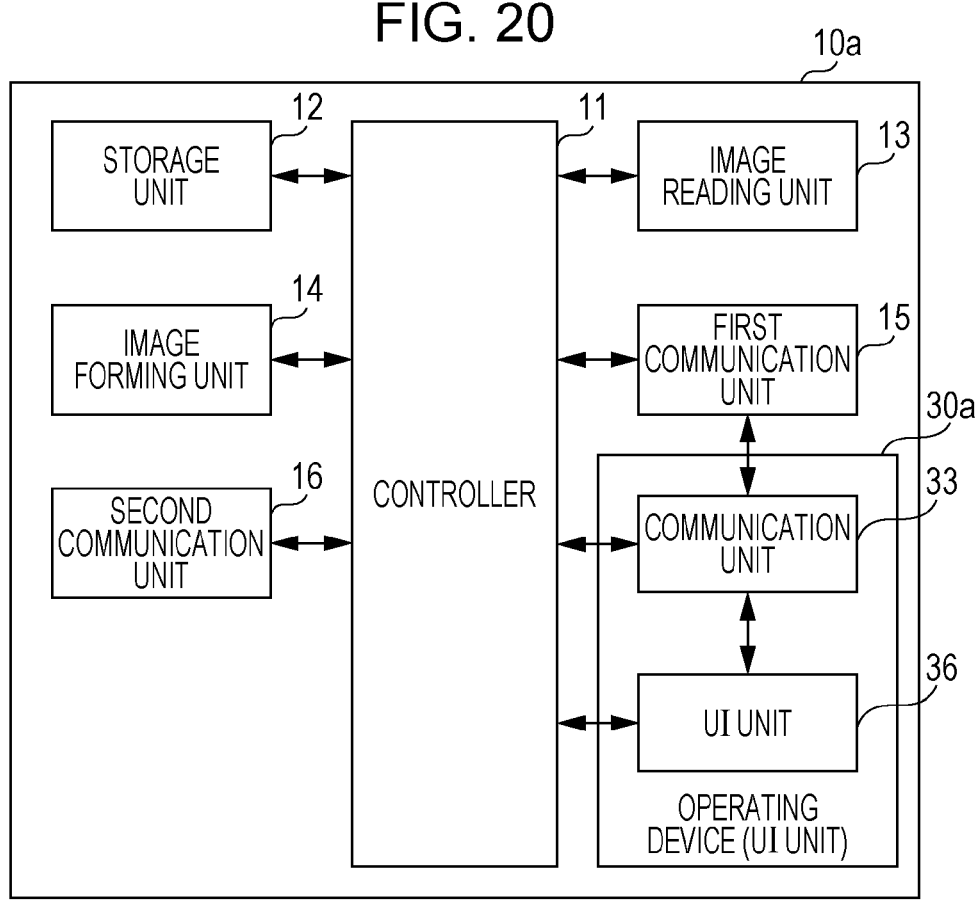
FIG. 20 is a diagram illustrating an example of a hardware configuration of an information processing device according to an exemplary modification.

FIG. 20 is a diagram illustrating an example of a hardware configuration of an information processing device according to an exemplary modification. The example of FIG. 20 illustrates an information processing device 10a equipped with the components other than the display unit among the components illustrated in FIG. 4, and an operating device 30a. Likewise in this exemplary modification, the operating device 30a is secured to the housing of the information processing device 10a. The operating device 30a is equipped with the communication unit 33 illustrated in FIG. 3, and a UI unit 36.

The communication unit 33 and the UI unit 36 are connected to a bus inside the information processing device 10a, and controlled by the controller 11. In addition, the communication unit 33 is also connected to the first communication unit 15. The UI unit 36 is equipped with a display screen and a touch sensor layered with the display screen, and displays images while also accepting operations from a user. The UI unit 36 supplies the controller 11 with operation data according to accepted user operations, and the controller 11 conducts processes according to the operation data.

In the present exemplary modification, the controller 11 realizes the function of the operating part 300 illustrated in FIG. 5 by executing a browser program. For example, the displaying part 301 receives, via the communication unit 33, operating image data transmitted via the first communication unit 15, and displays the received operating image data on the UI unit 36. Also, the requesting part 302 receives an operation performed on an operating image as a result of the UI unit 36 being tapped. Also, the requesting part 302 transmits, via the communication unit 33 and the first communication unit 15, instruction data indicating instructions determined by the operation received as above. In this way, even in the present exemplary modification, communication between the information processing device and the display device 4 is conducted via a shared mediating part in both the case of going through another communication device, and the case of not going through.

[2-3] Installation of Operating Device

Although, the operating device 30 is secured to the housing of the information processing device in the exemplary embodiment and the above exemplary modification, the operating device 30 may also not be secured.

Figure 21:
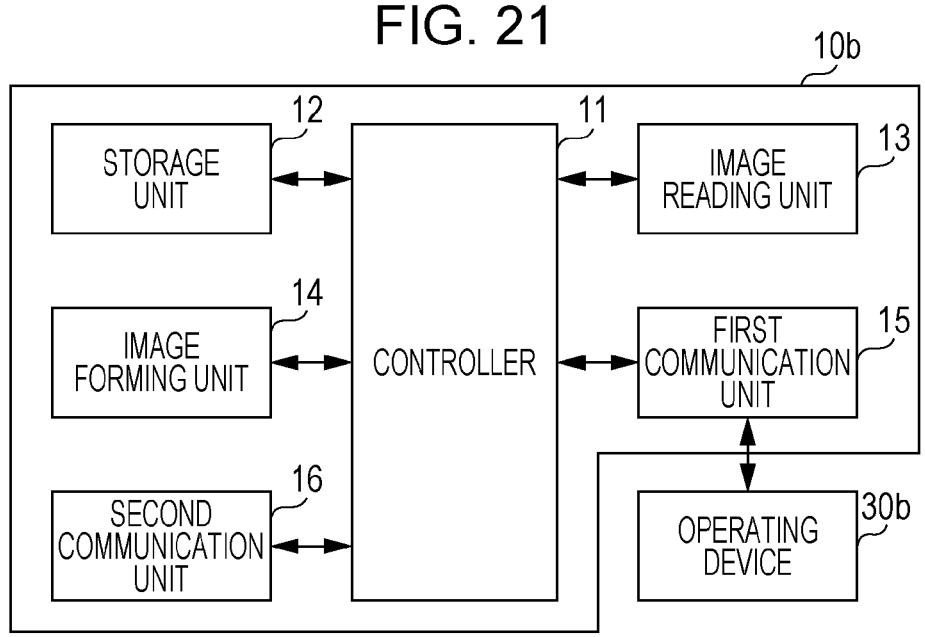
FIG. 21 is a diagram illustrating an example of a hardware configuration of an information processing device according to an exemplary modification.

FIG. 21 is a diagram illustrating an example of a hardware configuration of an information processing device according to an exemplary modification. The example of FIG. 21 illustrates an information processing device 10b equipped with the components other than the display unit among the components illustrated in FIG. 4, and an operating device 30b. The operating device 30b is equipped with the components illustrated in FIG. 3, and is a device that functions as the operating part 200 illustrated in FIG. 5.

The operating device 30b is connected to the first communication unit 15 via a communication cable, and is used by a user while in a state of being installed on the housing of the information processing device 10b or placed on a nearby desk or the like. Like of the operating device 30 of the exemplary embodiment, the operating device 30b communicates with the information processing device 10 without going through another communication device (for example, the communication equipment 3 illustrated in FIG. 1). Note that the operating device 30b may also be detached from the communication cable, brought to another location, and used for a separate purpose. Note that in the example of FIG. 21, another device functioning as an operating part (for example, the user device 20 illustrated in FIG. 1 and the like) may also be connected instead of the operating device 30b. Additionally, the operating device 30b may also be connected to the communication equipment 3 and made to communicate with the information processing device 10b via the communication equipment 3 and the communication link 2.

[2-4] Processing Part

The processing conducted by the processing part 103 is not limited to that discussed in the exemplary embodiment, and may be any type of processing. For example, if the information processing device includes an industrial machine and a controlling device, the processing part 103 conducts a process of transporting and working material with the machine. Even in this case, the information processing device is operated by communication conducted through a common mediating part for both the user device 20 and the operating device 30.

[2-5] Requesting Part

In the exemplary embodiment, the requesting part 402 receives an operation via a touch sensor, but the configuration is not limited thereto. If the local device is a tablet, an operation may be received via a button provided on the case, whereas if the local device is a personal computer, an operation may be received via a peripheral such as keyboard or mouse.

[2-6] Mediating Part

In the exemplary embodiment, the mediating part 101 conforms to the SOAP standard, but is not limited thereto, and may also mediate communication conforming to a standard such as Representational State Transfer (REST) or Standard Generalized Markup Language (SGML), for example. Generally, it is sufficient for the mediating part 101 to mediate communication conforming to a standard used on the web. Consequently, most devices capable of running a browser are usable as an operating device.

[2-7] Upper Limit on Quantity of Second Operating Images

In the exemplary embodiment, an upper limit on the quantity of second operating images is decided according to the size of a usable storage area in the display device 4, but the configuration is not limited thereto. For example, an upper limit may also be decided according to the processing performance of the display device 4. Processing performance may be expressed by the number of CPU cores or the CPU clock speed, for example. Otherwise, processing performance may be expressed by factors such as the capacity of the RAM, HDD, SSD, or the like (not the available capacity, but the capacity including the portion currently being utilized), or the video card (also called the graphics board) performance. Like the usable storage area in the exemplary embodiment, information expressing these types of performance is acquired from the operating system, and transmitted by being stated in operating image request data.

FIG. 22 is a diagram illustrating an example of an upper limit table according to the present exemplary modification. In this example, the numbers "10", "20", and "30" of image files representing operating images are respectively associated as upper limits for the processing performance values "1 core", "2 cores", and "3 cores or more". The providing part 102 of the information processing device 10 decides an upper limit on the quantity of second operating images by using the upper limit table as conducted in the exemplary embodiment.

For example, with a higher-performance CPU or video card, even if operating images are stored in the storage area of the display device 4 and the free space is reduced, the time until the display device 4 responds to a user operation and completes a process corresponding to the operation (hereinafter called the "response time") is less likely to be long. Also, with higher-capacity RAM and the like, it is easier to leave more free space in the storage area of the display device 4 when operating images are stored, and the response time is less likely to be long. In other words, by deciding an upper limit according to the processing performance as above, longer response times of the display device 4 are minimized compared to the case of providing operating images exceeding the upper limit.

Additionally, an upper limit may also be decided according to a history of operations performed on first operating images or second operating images. In this case, the displaying part 401 stores, as an operation history, a count of the number of times an operation was performed on an operating image over a predetermined period of the past (such as one week or one month), and stores the operation history in association with identification information identifying that operating image, for example.

FIG. 23 is a diagram illustrating an example of a stored operation history. In FIG. 23, the identification information of the operating images A12, A13, A14, and A15 illustrated in FIG. 6 are expressed as "A12", "A13", "A14", and "A15". In this example, the operation histories "4 times", "8 times", "12 times", and "2 times" are stored respectively in association with the identification information. The displaying part 401 transmits this stored information to the providing part 102 by stating this stored information in operating image request data for transmission. The storage unit 12 of the information processing device 10 stores an upper limit table associating a total count expressing the transmitted operation histories of the first operating images with an upper limit.

FIG. 24 is a diagram illustrating another example of an upper limit table according to the present exemplary modification. In this example, the numbers "10", "20", and "30" of image files representing operating images are respectively associated as upper limits for the operation history totals "less than 20 times", "at least 20 times, less than 50 times", and "at least 50 times". The providing part 102 decides an upper limit on the quantity of second operating images by using transmitted operation histories and the upper limit table as conducted in the exemplary embodiment. For example, if the operation histories illustrated in FIG. 23 are transmitted, the total of the operation histories of the first operating images is 4+8+12+2=26 times, and thus the providing part 102 decides the upper limit of "20" associated with "at least 20 times, less than 50 times". Note that although the case of using the operation histories of the first operating images is described herein, an upper limit may also be decided as above when using operation histories of the second operating images.

As the total of the operation histories of the first operating images becomes greater, the likelihood of one of the first operating images being operated becomes higher, and the likelihood of second operating images being displayed also becomes correspondingly higher. Also, as the total of the operation histories of the second operating images becomes greater, the likelihood of second operating images being displayed and also operated becomes higher. Accordingly, by increasing the upper limit as the total of the operation histories becomes greater, as in the example of FIG. 24, more second operating images are provided in advance when there is a high likelihood of second operating images being displayed or operated, whereas fewer second operating images are provided in advance when there is a low likelihood. Consequently, the number of operating images that are provided in advance but end up not being displayed is reduced compared to the case of not using an upper limit according to an operation history.

[2-8] Other Upper Limits

In the exemplary embodiment and the exemplary modification discussed above, the providing part 102 decides an upper limit on the basis of information related to the display device 4 (size of usable storage area, processing performance, operation history). Besides the above, the type of hardware of the display device 4, for example, may also be used as information related to the display device 4. For example, hardware types may be ranked by highest processing performance and decreasing in the order of personal computers, tablets, and smartphones, and an upper limit may be decided as in the case of using processing performance discussed earlier.

Otherwise, if operating images are to be provided with data sizes corresponding to the size of the display screen of the display device 4 (if operating images with larger data sizes are provided to larger display screens), the providing part 102 may also decide an upper limit on the basis of the size of the display screen. In the case of using the number of image files representing operating images as an upper limit, the upper limit may be decreased due to the increasing data size for larger display screens, whereas in the case of using the data size of operating images as an upper limit, the upper limit may be increased to match the increasing data size for larger display screens.

Additionally, an upper limit may also be decided on the basis of information other than information related to the display device 4. For example, an upper limit may be decided according to the type of image files representing operating images. For example, if operating images are represented not only by still images but also by moving images (such as a button constituting an operating image moving, changing shape, or changing color), the types of image files may be classified into files representing still images (such as Joint Photographic Experts Group (JPEG) images and Graphics Interchange Format (GIF) images), and files representing moving images (such as Moving Pictures Experts Group (MPEG) videos and animated GIFs).

In this case, since the files representing moving images are larger in data size, the upper limit may be decreased when using the number of image files representing operating images as the upper limit, whereas the upper limit may be increased when using the data size of operating images as the upper limit. When using either upper limit, since operating images with a possibility of being displayed are provided within a range not exceeding the upper limit, the decrease of free space in the storage area of the display device 4 is moderated compared to the case of providing the operating images without limits.

[2-9] Priority Level of Second Operating Images

In the exemplary embodiment, when selecting what to provide from among multiple second operating images, a method of using a predetermined order or rotation and a method of random selection were discussed, but the method is not limited thereto. For example, the providing part 102 may also set a priority level for each second operating image, and select what to provide by prioritizing second operating images with a high priority level over a low priority level.

For example, from among multiple second operating images, the providing part 102 prioritizes providing second operating images corresponding to operations for displaying a status reported by the notifying part 104 over other second operating images. The status reported by the notifying part 104 may be the number of copies illustrated in FIGS. 7A and 7B, for example. Also, in the case of connecting a memory key storing images to the connecting unit 17 illustrated in FIG. 4 to load images, a list of thumbnail images or the like of the loaded images is reported as a status of the loading process. Otherwise, when the processing part 103 executes processes such as the scan process, fax process, and print process, the status of each process is reported by the notifying part 104 and displayed by the displaying part 401 of the display device 4.

When second operating images corresponding to operations for displaying such a status of a process are included among the multiple second operating images, the providing part 102 prioritizes and provides in advance those second operating images over other second operating images. However, even in this case, the providing part 102 provides second operating images within a range not exceeding a predetermined upper limit. For example, if the operating image group A1 illustrated in FIG. 6 is displayed after an operation is performed one of first operating images included on a menu screen, the images included in the operating image group A1 become second operating images while that menu screen is being displayed. As discussed earlier, since the status illustrated in FIGS. 7A and 7B is displayed after the operating image A15 is operated, the operating image A15 corresponds to an operation for displaying a status, and thus is prioritized over other operating images and provided in advance as a second operating image.

The other operating images in this case are, for example, the operating images displayed when an operation is performed on an operating image other than an operating image for displaying the operating image group A1 on the menu screen. Note that for operating images included in the operating image group A1, such as the operating images A12, A13, and A14 displayed together with the operating image A15, the providing part 102 may provide these operating images with priority over other operating images as discussed above, or provide these operating images without priority. When prioritizing these operating images, two priority levels may also be set to further prioritize the operating image A15 over the other operating images included in the operating image group A1.

In addition, the providing part 102 may also provide second operating images displayed together with the reported status of a process over other second operating images. For example, when the status of a process indicating the number of copies illustrated in FIGS. 7A and 7B is reported, the operating images A27 and A28 are displayed together with the status, and thus the providing part 102 may provide these operating images in advance as second operating images with priority over other operating images. The other operating images in this case refer to the operating images displayed by operating the operating images A12, A13, and A14 (for example, the operating image group A2 illustrated in FIG. 8A).

While a process is being executed, the user often performs operations for displaying the status of the process in order to check the status of the process. In other words, operations for displaying the status of the process are highly likely to be performed compared to other operations. In the present exemplary modification, since operating images corresponding to operations with a high likelihood of being performed in this way are prioritized and provided, second operating images more likely to be operated by the user are provided compared to the case of providing second operating images without accounting for correspondences between operations for displaying the status of a process, and operating images.

The providing part 102 may also use priority levels of second operating images configured with a different method from the above. For example, from among multiple second operating images, the providing part 102 prioritizes providing second operating images selected according to a history of operations performed on each over other second operating images. For example, when the operating images A12, A13, A14, and A15 illustrated in FIG. 6 are first operating images, the displaying part 401 stores, as an operation history, the total number of times, over a predetermined period of the past (such as one week or one month), that an operation was performed on second operating images displayed when each first operating image is operated.

Figures 25, 26:
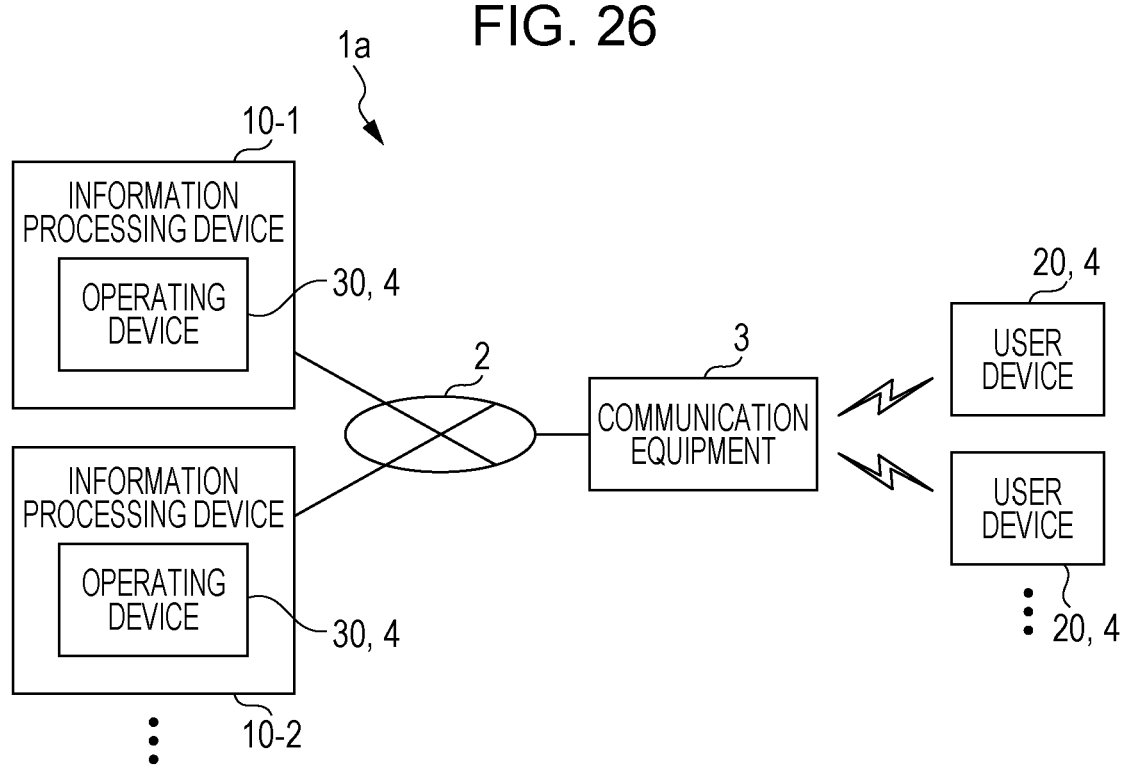
FIG. 25 is a diagram illustrating stored operation histories.
FIG. 26 is a diagram illustrating an example of an overall configuration of an information processing system according to an exemplary modification.

FIG. 25 is a diagram illustrating an example of stored operation histories. In FIG. 25, the operation counts "12 times", "8 times", "28 times", and "2 times" are stored respectively in association with identification information of the operating images A12, A13, A14, and A15, as operation histories of the second operating images in the case of treating the corresponding operating images A12, A13, A14, and A15 as the first operating image. These operation histories are transmitted to the providing part 102 like the operation histories illustrated in FIG. 23. For example, the providing part 102 raises the priority level for higher operation counts indicated by the operation histories, and selects what to provide in order of highest priority level while also selecting a quantity to provide that does not exceed the upper limit.

If the upper limit is 10 images, the upper limit is exceeded when adding together the second operating images (8 images) corresponding to the operating image A14 with the highest count of "28" expressed by the operation history, and the second operating images (6 images) corresponding to the operating image A12 with the next highest count of "12". For this reason, the providing part 102 selects the second operating images corresponding to the operating image A14 as the second operating images to provide. Consequently, operating images which are operated more often are more likely to be stored in advance as second operating images, and the number of operating images that are provided in advance but end up not being displayed is reduced compared to the case of not using priority levels according to operation histories.

[2-10] Multiple Information Processing Devices

In the exemplary embodiment, there is one information processing device 10, but multiple information processing device 10s may exist in some cases.

FIG. 26 is a diagram illustrating an example of an overall configuration of an information processing system 1a according to the present exemplary modification. The information processing system 1a is equipped with multiple information processing devices 10 including information processing devices 10-1 and 10-2, but otherwise is similar in configuration to FIG. 1.

In the information processing system 1a, in some cases the information processing device 10-1 may provide the operating image group A1 illustrated in FIG. 6 to the display device 4, and then later the information processing device 10-2 may provide the operating image group A1 to the display device 4, for example. If the operating images provided by an information processing device 10 (in this example, the information processing device 10-2) already have been provided by another information processing device 10 (in this example, the information processing device 10-1) in this way, the displaying part 401 of the display device 4 discards one or the other of the operating images without temporarily storing the operating images.

The displaying part 401 judges whether operating images are the same or different by the file names of the image data representing the operating images, for example. Note that the displaying part 401 may also judge whether operating images are the same or different by also accounting for the date created and the size of the files, in addition to the file name. In addition, the displaying part 401 may keep the previously stored operating image group A1 and discard the newly provided operating image group A1, or discard the previously stored operating image group A1 and store the newly provided operating image group A1. Consequently, duplicate operating images are no longer stored in the storage area of the display device 4.

In the information processing system 1a, the operating images used in each information processing device 10 may differ in some cases. For example, in some cases, the operating image A26 illustrated in FIG. 8A may be used in the information processing device 10-1, but not used in the information processing device 10-2. In this way, if a first operating image (in this example, the operating image A26) provided by a first information processing device (in this example, the information processing device 10-1) is not used for the operation of a second information processing device (in this example, the information processing device 10-2), when operating images for operating the second information processing device are displayed, the displaying part 401 of the display device 4 displays the operating images as follows.

Figure 27A:
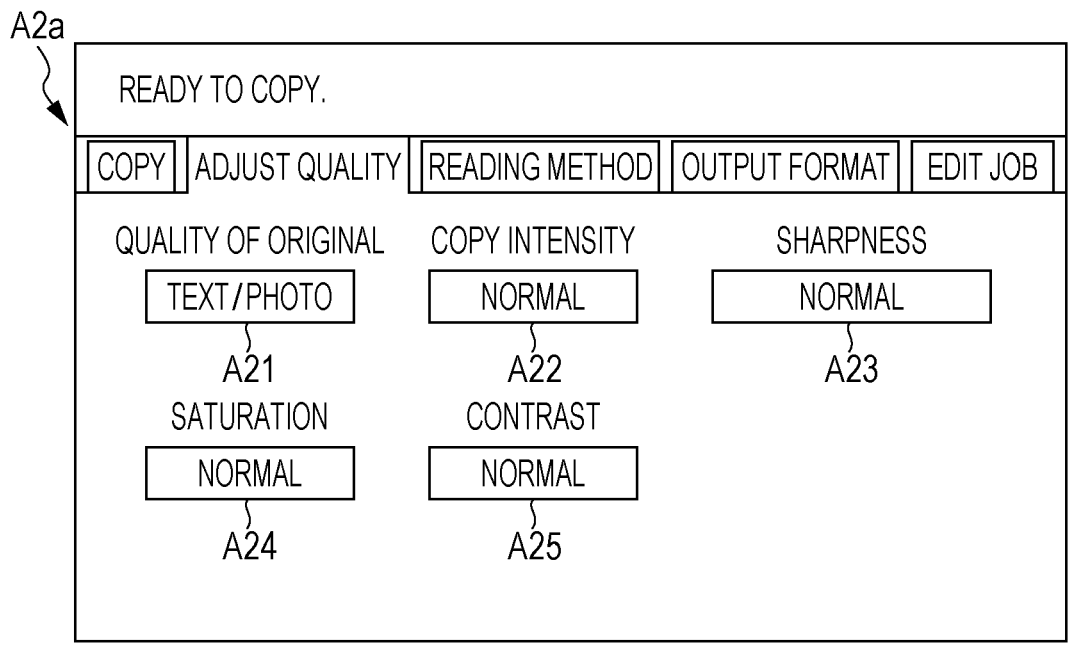
FIGS. 27A and 27B are diagrams illustrating an example of displayed operating images.
Figure 27B:
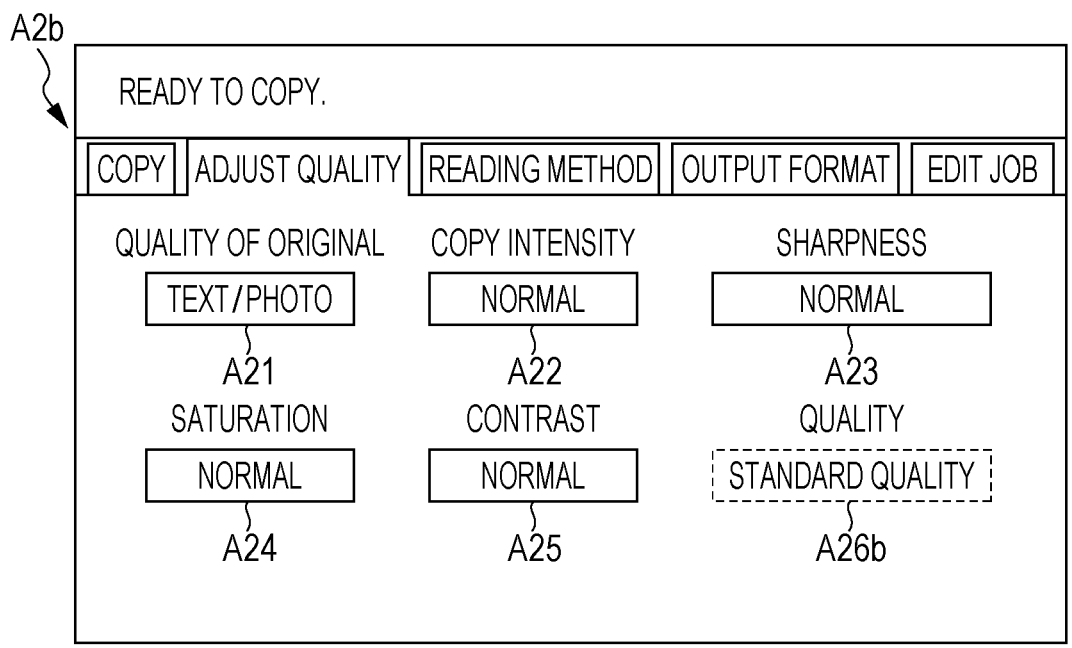

FIGS. 27A and 27B are diagrams illustrating an example of displayed operating images. In FIG. 27A, an operating image group A2a is displayed. The operating image group A2a includes the operating images included in the operating image group A2 illustrated in FIG. 8A, except for the operating image A26 (the first operating image in this example). When the operating image group A2 is provided by the information processing device 10-1, the displaying part 401 stores the operating image A26 in a local storage area. After that, when the operating image group A2a is provided by the information processing device 10-2, since the operating image group A2a does not include the operating image A26 constituting the first operating image, the displaying part 401 displays the other operating images (from A21 to A25), but does not display the first operating image (operating image A26).

At this point, the displaying part 401 may delete the operating image A26 from the storage area, or keep the operating image A26 temporarily stored in the storage area but not displayed. In the latter case, when the operating images of the information processing device 10-1 are displayed again, the stored operating image A26 becomes displayable. Note that the displaying part 401 may also display the inoperable first operating image in a different format from the other operating images.

FIG. 27B illustrates an operating image A26b, which is an example of a first operating image displayed in this case. The edges of the operating image A26b are indicated by a dashed line, and displayed in a different format from the edges of the other operating images, which are indicated with solid lines. Note that the displaying part 401 may also display the first operating image in a lighter color (such as gray) than the other operating images, or display the first operating image at reduced size.

If the first operating image is removed from display as in the example of FIG. 27A, the user perceives all displayed operating images as being operable. Alternatively, by displaying the first operating image in a different format as in the example of FIG. 8B, the user intuitively perceives that an operation on the first operating image will not be accepted. In both cases, the user is discouraged from performing an action of operating an operating image which is not used to operate the second information processing device 10 (that is, the first operating image) compared to the case of not presenting the display of the first operating image like in the present exemplary modification.

[2-11] Requesting Second Operating Images

In the exemplary embodiment, the providing part 102 of the information processing device 10 selects and provides second operating images to be provided, but the display device 4 may also select and request what to provide. In this case, the displaying part 401 of the display device 4 requests the information processing device 10 for a first operating image to display locally, and also requests the information processing device 10 in advance for second operating images to be displayed when that first operating image is operated. However, the displaying part 401 requests second operating images within a range not exceeding a quantity predetermined as an upper limit.

The displaying part 401 stores an upper limit table as illustrated in FIG. 18 or the like, for example, and requests second operating images after deciding an upper limit as conducted by the providing part 102 in the exemplary embodiment and the above exemplary modification. The providing part 102 provides the display device 4 with a first operating image and second operating images requested in this way. Consequently, a decrease of free space in the storage area of the display device 4 is moderated like in the case of the providing part 102 providing second operating images within a range not exceeding an upper limit.

[2-12] Third Operating Images

In the exemplary embodiment and the above exemplary modification, for example, when the operating image A12 illustrated in FIG. 6 is treated as the first operating image, the operating images A21 to A26 illustrated in FIG. 8A are provided in advance as the second operating images, but in addition to the above, third operating images (for example, the operating images A31 to A35 illustrated in FIG. 8B) displayed when a second operating image is operated may also be provided in advance. Furthermore, fourth operating images displayed when a third operating image is operated may also be provided in advance. Generally, the operation performed to display an operating image provided in advance is not limited to being an operation performed on a single operating image, and operating images with a possibility of being displayed may be provided in advance, even if those operating images are displayed by performing multiple operations on multiple operating images. In any case, it is sufficient to provide operating images within a range not exceeding an upper limit as discussed above, and as a result, a decrease of free space in the storage area of the display device 4 is moderated.

[2-13] Categories of the Invention

Besides an information processing device, a display device, communication equipment, and an information processing system equipped with these devices, the present invention may also be interpreted as an information processing method for realizing processing carried out by these devices. In addition, the present invention may be interpreted as a program for causing a computer including an information processing device and a display device to function as the parts discussed in the foregoing. The program may be provided in the form of a recording medium such as an optical disc with the program stored thereon, and may also be provided in a form causing a computer to download the program via a communication link such as the Internet, and install and make the program available for use, for example.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing device comprising:
    a processor configured to execute a process;
    a controller configured to control the processor to execute the process when an operation on an operating image corresponding to the process is requested from a display device that temporarily stores and displays an externally provided operating image; and
    an image providing device configured to provide a first operating image to be displayed by the display device to the display device, and provides, to the display device in advance, at least one second operating image from a plurality of second operating images, the at least one second operating image being displayed in the event the first operating image is selected, the at least one second operating image being provided within a range not exceeding a quantity predetermined as an upper limit, wherein the first operating image is related to at least one first function of the image processing device and the at least one second operating image is related to at least one second function, which is setting information of the first function, and among the plurality of second operating images from which the at least one second operating image is provided to the display device in advance, the image providing device sets a priority level for each second operating image to determine which of the second operating images are to be provided to the display device in response to the operation on the operating image, and one or more of the second operating images that correspond to an operation to display a reported status are given a higher priority than those of the second operating images that do not correspond to an operation to display a reported status.

2. The information processing device according to claim 1, wherein the upper limit is determined according to a size of a usable storage area of the display device.

3. The information processing device according to claim 1, wherein the upper limit is determined according to a processing performance of the display device.

4. The information processing device according to claim 1, wherein the upper limit is determined according to a history of operations performed on the first operating image or the at least one second operating image.

5. The information processing device according to claim 1, further comprising:

a notifier configured to report, to the display device, a status of the process executed by the processor.

6. The information processing device according to claim 1, wherein among the plurality of second operating images, the image providing device further prioritizes providing the second operating images selected according to a history of operations performed on each over other kinds of second operating images.

7. The information processing device according to claim 1, wherein at least one of the plurality of second operating images is not displayed with the first operating image when the first operating image is requested from the display device.

8. An information processing system comprising:
the information processing device according to claim 1; and
a display device configured to temporarily store and display the operating image provided by the information processing device, and when an operation is performed on the operating image, requests the information processing device to execute a process corresponding to the operation.

9. The information processing system according to claim 8, further comprising:

a plurality of the information processing device, wherein when an operating image provided by the information processing device already has been provided by another of the information processing device, the display device discards one or the other of the operating image without temporarily storing the operating image to be discarded.

10. The information processing system according to claim 9, wherein in a case in which a first operating image provided by a first information processing device is not used to operate a second information processing device, when the display device displays operating images for operating the second information processing device, the display device does not display the first operating image or displays the first operating image in a disabled format different from operating images for operating the second information processing device.

11. The information processing system according to claim 8, wherein in a case in which a first operating image provided by a first information processing device is not used to operate a second information processing device, when the display device displays operating images for operating the second information processing device, the display device does not display the first operating image or displays the first operating image in a disabled format different from operating images for operating the second information processing device.

12. A display device comprising:

a display configured to temporarily store and display an operating image provided by an information processing device equipped with a processor that is configured to execute a process corresponding to the operating image, the display being configured to request the information processing device for a first operating image to display locally, and also requests the information processing device in advance for at least one second operating image from a plurality of second operating images, the at least one second operating image being displayed when the first operating image is selected, the at least one second operating image being provided within a range not exceeding a quantity predetermined as an upper limit; and a requesting device configured to request the information processing device to execute a process corresponding to an operation performed on the operating image which is displayed, wherein the first operating image is related to at least one first function of the image processing device, and the at least one second operating image is related to at least one second function, which is setting information of the first function, and among the plurality of second operating images from which the at least one second operating image is provided to the display device in advance, a priority level is set for each second operating image to determine which of the second operating images are to be provided to the display device in response to the operation on the operating image, and one or more of the second operating images that correspond to an operation to display a reported status are given a higher priority than those of the second operating images that do not correspond to an operation to display a reported status.

13. An information processing method comprising:
providing a processor configured to execute a process on an information processing device;

controlling the processor to execute the process when an operation on an operating image corresponding to the process is requested from a display device, the display device being configured to temporarily store and display an externally provided operating image; and providing a first operating image to be displayed by the display device to the display device, and providing, to the display device in advance, at least one second operating image from a plurality of second operating images, the at least one second operating image being displayed when the first operating image is selected, the at least one second operating image being provided within a range not exceeding a quantity predetermined as an upper limit, wherein the first operating image is related to at least one first function of the image processing device and the at least one second operating image is related to at least one second function, which is setting information of the first function, and among the plurality of second operating images from which the at least one second operating image is provided to the display device in advance, a priority level is set for each second operating image to determine which of the second operating images are to be provided to the display device in response to the operation on the operating image, and one or more of the second operating images that correspond to an operation to display a reported status are given a higher priority than those of the second operating images that do not correspond to an operation to display a reported status.

14. A non-transitory computer readable medium storing a program causing a computer to execute a process for processing information, the process comprising:

controlling an execution of a process when an operation on an operating image corresponding to the process is requested from a display device, the display device being configured to temporarily store and display an externally provided operating image; and providing a first operating image to be displayed by the display device to the display device, and providing, to the display device in advance, at least one second operating image from a plurality of second operating images, the at least one second operating image being displayed when the first operating image is selected, the at least one second operating image being provided within a range not exceeding a quantity predetermined as an upper limit, wherein the first operating image is related to at least one first function of the image processing device and the at least one second operating image is related to at least one second function, which is setting information of the first function, and among the plurality of second operating images from which the at least one second operating image is provided to the display device in advance, a priority level is set for each second operating image to determine which of the second operating images are to be provided to the display device in response to the operation on the operating image, and one or more of the second operating images that correspond to an operation to display a reported status are given a higher priority than those of the second operating images that do not correspond to an operation to display a reported status.

15. A non-transitory computer readable medium storing a program causing a computer to execute a process for processing information, the process comprising:

temporarily storing and displaying an operating image corresponding to a process, the operating image provided by an information processing device equipped with a processor configured to execute the process when an operation on the operating image is requested, requesting the information processing device for a first operating image to display locally, and also requesting the information processing device in advance for at least one second operating image from a plurality of second operating images, the at least one second operating image being displayed when the first operating image is selected, the at least one second operating image being provided within a range not exceeding a quantity predetermined as an upper limit; and requesting the information processing device to execute the process corresponding to an operation performed on the operating image which is displayed, wherein the first operating image is related to at least one first function of the image processing device and the at least one second operating image is related to at least one second function, which is setting information of the first function, and among the plurality of second operating images from which the at least one second operating image is provided to the display device in advance, a priority level is set for each second operating image to determine which of the second operating images are to be provided to the display device in response to the operation on the operating image, and one or more of the second operating images that correspond to an operation to display a reported status are given a higher priority than those of the second operating images that do not correspond to an operation to display a reported status.

* * * * *